US012528743B2

(12) United States Patent
Shah et al.

(10) Patent No.: US 12,528,743 B2
(45) Date of Patent: Jan. 20, 2026

(54) CONTINUOUS ADDITIVE MANUFACTURING METHOD FOR MAKING CERAMIC ARTICLES, AND CERAMIC ARTICLES

(71) Applicant: Solventum Intellectual Properties Company, Maplewood, MN (US)

(72) Inventors: Amy T. Shah, St. Paul, MN (US); James D. Hansen, White Bear Lake, MN (US); David B. Stegall, St. Paul, MN (US); Alexander J. Huffman, St. Paul, MN (US); Gareth A. Hughes, St. Paul, MN (US); Melissa A. Lackey, Woodbury, MN (US); Kathleen M. Humpal, Stillwater, MN (US); Andreas M. Geldmacher, Dormagen (DE); Kristen F. Keller, Costa Mesa, CA (US)

(73) Assignee: Solventum Intellectual Properties Company, Maplewood, MN (US)

( * ) Notice: Subject to any disclaimer, the term of this patent is extended or adjusted under 35 U.S.C. 154(b) by 1020 days.

(21) Appl. No.: 17/626,179

(22) PCT Filed: Aug. 3, 2020

(86) PCT No.: PCT/IB2020/057327
§ 371 (c)(1),
(2) Date: Jan. 11, 2022

(87) PCT Pub. No.: WO2021/024162
PCT Pub. Date: Feb. 11, 2021

(65) Prior Publication Data
US 2022/0380260 A1   Dec. 1, 2022

Related U.S. Application Data

(60) Provisional application No. 62/883,239, filed on Aug. 6, 2019.

(51) Int. Cl.
*C04B 35/488* (2006.01)
*C04B 35/624* (2006.01)
(Continued)

(52) U.S. Cl.
CPC .......... *C04B 35/488* (2013.01); *C04B 35/624* (2013.01); *C04B 35/62655* (2013.01);
(Continued)

(58) Field of Classification Search
CPC ............ C04B 35/053; C04B 35/58078; C04B 35/58071; C04B 35/583; C04B 35/50;
(Continued)

(56) References Cited

U.S. PATENT DOCUMENTS 3,018,262 A    1/1962  Schroeder
3,117,099 A    1/1964  Proops
(Continued)

FOREIGN PATENT DOCUMENTS

CN    101917925 A    12/2010
CN    102782089 A    11/2012
(Continued)

OTHER PUBLICATIONS

Envisiontec, "The Ultimate Guide to 3D Printing with High-Speed Continuous Technology", White Paper, Date unknown but believed to be prior to the date of the filing of the present application, pp. 1-10.
(Continued)

*Primary Examiner* — Monica A Huson

(57) ABSTRACT

The present disclosure provides a method of making a ceramic article. The method includes (a) obtaining a photopolymerizable slurry or sol including a plurality of ceramic particles distributed in the photopolymerizable slurry or sol and (b) selectively polymerizing the photopolymerizable slurry or sol using actinic radiation and con-
(Continued)

tinuous movement of a build substrate through the photopolymerizable slurry or sol to form a gelled article. The method also includes (c) extracting solvent from the gelled article to form an aerogel article or a xerogel article; (d) heat treating the aerogel article or the xerogel article to form a porous ceramic article; and (e) sintering the porous ceramic article to form a sintered ceramic article. The sintered ceramic article exhibits a particular density. Further, additive manufactured ceramic articles are provided that exhibit a particular density, opacity, or both. Preferably, all cross-sectional portions of an interior of the ceramic article having selected dimensions are free of a frequency analysis signal maxima larger than a background signal.

20 Claims, 9 Drawing Sheets

(51) Int. Cl.
  *C04B 35/626* (2006.01)
  *C04B 35/64* (2006.01)
  *C04B 38/00* (2006.01)
  *C04B 38/10* (2006.01)

(52) U.S. Cl.
  CPC .......... *C04B 35/6269* (2013.01); *C04B 35/64* (2013.01); *C04B 38/0045* (2013.01); *C04B 38/10* (2013.01); *C04B 2235/3225* (2013.01); *C04B 2235/3227* (2013.01); *C04B 2235/3246* (2013.01); *C04B 2235/3298* (2013.01); *C04B 2235/48* (2013.01); *C04B 2235/6026* (2013.01); *C04B 2235/606* (2013.01); *C04B 2235/9646* (2013.01)

(58) Field of Classification Search
  CPC ..... C04B 35/64; C04B 35/505; C04B 35/584; C04B 35/195; C04B 35/111; C04B 35/62655; C04B 35/581; C04B 38/0045; C04B 35/565; C04B 35/624; C04B 38/10; C04B 35/486; C04B 35/5611; C04B 35/447; C04B 35/488; C04B 35/5622; C04B 35/14; C04B 35/5805; C04B 35/00; C04B 35/6269; C04B 35/44; C04B 35/563; C04B 2235/5454; C04B 2235/3298; C04B 2235/6026; C04B 2235/3227; C04B 2235/77; C04B 2235/606; C04B 2235/9646; C04B 2235/3246; C04B 2235/94; C04B 2235/3225; C04B 2235/9653; C04B 2235/48; B29C 64/135; B28B 1/001; B33Y 70/00
  See application file for complete search history.

(56) References Cited

U.S. PATENT DOCUMENTS

| | | | |
|---|---|---|---|
| 3,729,313 A | 4/1973 | Smith | |
| 3,741,769 A | 6/1973 | Smith | |
| 3,808,006 A | 4/1974 | Smith | |
| 4,250,053 A | 2/1981 | Smith | |
| 4,394,403 A | 7/1983 | Smith | |
| 4,575,330 A | 3/1986 | Hull | |
| 5,658,063 A | 8/1997 | Nasserbakht | |
| 5,905,545 A | 5/1999 | Poradish | |
| 6,187,833 B1 | 2/2001 | Oxman | |
| 6,587,159 B1 | 7/2003 | Dewald | |
| 6,730,156 B1 | 5/2004 | Windisch | |
| 7,164,397 B2 | 1/2007 | Pettitt | |
| 7,360,905 B2 | 4/2008 | Davis | |
| 7,892,474 B2 | 2/2011 | Shkolnik | |
| 8,283,843 B2 | 10/2012 | Pan et al. | |
| 8,705,133 B2 | 4/2014 | Lieb | |
| 8,820,944 B2 | 9/2014 | Vasquez | |
| 9,205,601 B2 | 12/2015 | DeSimone | |
| 9,360,757 B2 | 6/2016 | DeSimone | |
| 9,446,557 B2 | 9/2016 | Zenere et al. | |
| 9,908,837 B2 | 3/2018 | Colby | |
| 9,993,974 B2 | 6/2018 | DeSimone | |
| 11,208,355 B2 | 12/2021 | Xu et al. | |
| 2007/0031791 A1 | 2/2007 | Cinader, Jr. | |
| 2018/0098828 A1 | 4/2018 | Hansen | |

FOREIGN PATENT DOCUMENTS

| | | |
|---|---|---|
| CN | 103313840 A | 9/2013 |
| CN | 104842565 A | 8/2015 |
| CN | 105837219 A | 8/2016 |
| CN | 106810215 A | 6/2017 |
| CN | 109795010 A | 5/2019 |
| CN | 109843830 A | 6/2019 |
| EP | 3203318 | 8/2017 |
| EP | 3303254 | 4/2018 |
| EP | 3303255 | 4/2018 |
| EP | 2605805 | 1/2019 |
| EP | 3322377 | 3/2019 |
| EP | 3362265 | 4/2021 |
| FR | 3036945 | 12/2021 |
| WO | 2009/053099 A1 | 4/2009 |
| WO | 2009/053100 A1 | 4/2009 |
| WO | WO 2009-085926 | 7/2009 |
| WO | WO 2013-055432 | 4/2013 |
| WO | WO 2014-151179 | 9/2014 |
| WO | WO 2016-140886 | 9/2016 |
| WO | WO 2016-191162 | 12/2016 |
| WO | WO 2016-191534 | 12/2016 |
| WO | WO 2017-066584 | 4/2017 |
| WO | WO 2017-116679 | 7/2017 |
| WO | WO 2017-155692 | 9/2017 |
| WO | WO 2017-201067 | 11/2017 |
| WO | WO 2018-100250 | 6/2018 |
| WO | WO 2018-151995 | 8/2018 |
| WO | WO 2019-005022 | 1/2019 |
| WO | WO 2019-048963 | 3/2019 |
| WO | WO 2020-046687 | 3/2020 |
| WO | WO 2020-157598 | 8/2020 |

OTHER PUBLICATIONS

Ghomi, "New Precipitation Method for Synthesis of Nano-Fluorapatite," Material Research Innovations, vol. 17, No. 4, 2013, pp. 257-262.
Kannan, "Synthesis and Mechanical Behaviour of Chlorapatite and Chlorapatite/β-TCP Composites," Journal of the European Ceramic Society, vol. 27, No. 5, 2007, pp. 2287-2294.
Lee, Handbook of Epoxy Resins, 1967, 3 pages.
Montazeri, "Synthesis of Fluorapatite-Hydroxyapatite Nanoparticles and Toxicity Investigations," International Journal of Nanomedicine, vol. 6, 2011, pp. 197-201.
Tumbleston, "Continuous Liquid Interface Production of 3D Objects", Science (AAAS), vol. 347 Issue 6228, 2015, pp. 1349-1352.
International Search Report for PCT International Application No. PCT/IB2020/057327 mailed on Nov. 2, 2020, 5 pages.

CONTINUOUS ADDITIVE MANUFACTURING METHOD FOR MAKING CERAMIC ARTICLES, AND CERAMIC ARTICLES

TECHNICAL FIELD

The present disclosure broadly relates to a continuous additive manufacturing method for producing ceramic articles having desirable properties. The invention also relates to ceramic articles, for instance obtainable by such a method.

BACKGROUND

In conventional ceramic processing, e.g. slip casting, the ceramic slurries usually have a particle load that is as high as possible to obtain an intermediate body with a high green density. A high green density is desired and often needed to enable the production of dense sintered ceramics. Powder-based additive manufacturing technologies, where the low packing density of the powder bed results in a highly porous 3D object, typically do not result in a high-density ceramic without the addition of large amounts of pressure during heat treatment, making the realization of dense complex three dimensional shapes challenging. Typically, this method leads to densities of less than 95% of the theoretical density of the ceramic material.

The processing of sols and slurries based on ceramic-filled photopolymers with stereolithography has shown promise due to its ability to form a green body in the production of relatively dense ceramic articles with three dimensional architecture. For instance, WO 2016/191162 (Mayr et al.) describes an additive manufacturing process for producing ceramic articles using a sol containing nano-sized particles.

Additive manufacturing technologies typically function by processing a layer at a time to build up a three-dimensional object. When using additive manufacturing to make objects from composite or multi-component materials, there is potentially a difference in local material composition and spatial distribution of discrete particles within the composite material. It can be challenging to use processes such as stereolithography to process multi-component materials containing a ceramic element to form articles that are uniform and have minimal defects.

SUMMARY

In a first aspect, an additive manufacturing method of making a ceramic article is provided. The method includes (a) obtaining a photopolymerizable slurry or sol including a plurality of ceramic particles distributed in the photopolymerizable slurry or sol and (b) selectively polymerizing the photopolymerizable slurry or sol using actinic radiation and continuous movement of a build substrate through the photopolymerizable slurry or sol to form a gelled article. Next, the method includes (c) extracting solvent from the gelled article to form an aerogel article or a xerogel article; (d) heat treating the aerogel article or the xerogel article to form a porous ceramic article; and (e) sintering the porous ceramic article to form a sintered ceramic article. The sintered ceramic article exhibits a density of 94% or greater with respect to a theoretical density of the ceramic material.

In a second aspect, a ceramic article is provided. The ceramic article is made by the method of the first aspect.

In a third aspect, an additively manufactured ceramic article is provided. The ceramic article exhibits a density of 94% or greater with respect to a theoretical density of the ceramic material, exhibits an opacity of 80% or less, or both. All cross-sectional portions of an interior of the ceramic article having a plane with dimensions of 0.5 mm×0.5 mm are free of a frequency analysis signal maxima larger than a background signal.

Ceramic articles made according to at least certain embodiments of this disclosure were found to exhibit high density and/or acceptable opacity despite being manufactured at a faster rate. Preferably, the continuous method minimizes differences in the optical properties within the interior of the articles, as compared to layer by layer methods.

The above summary of the present disclosure is not intended to describe each disclosed embodiment or every implementation of the present disclosure. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

Figure 1:
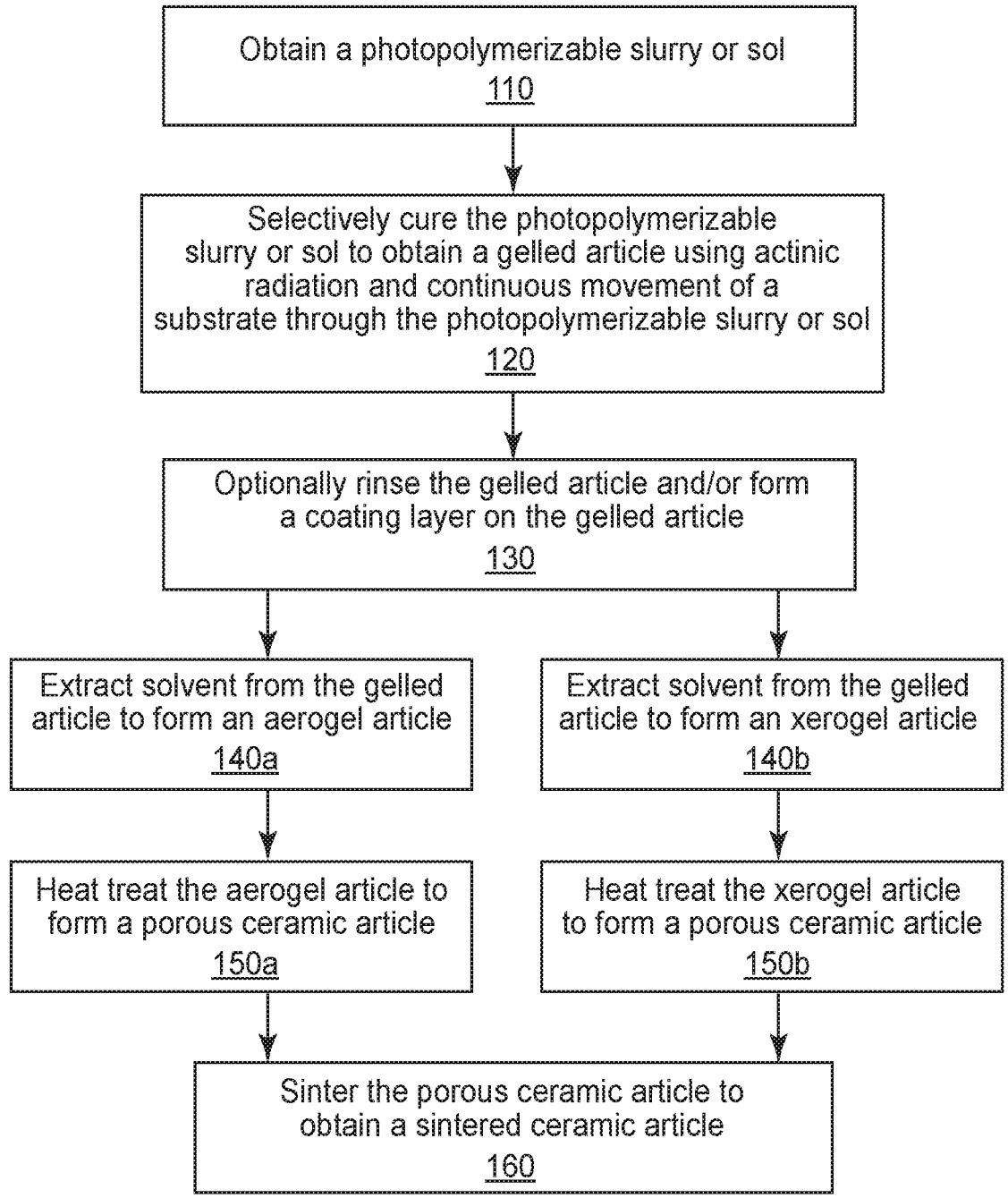
FIG. 1 is a flowchart of a process for building an article using the photopolymerizable compositions disclosed herein.

While the above-identified figures set forth several embodiments of the disclosure other embodiments are also contemplated, as noted in the description. The figures are not necessarily drawn to scale. In all cases, this disclosure presents the invention by way of representation and not limitation. It should be understood that numerous other modifications and embodiments can be devised by those skilled in the art, which fall within the scope and spirit of the principles of the invention.

DETAILED DESCRIPTION OF ILLUSTRATIVE EMBODIMENTS

The present disclosure provides a method to produce ceramic articles (e.g., parts) using continuous additive manufacturing from a particle loaded slurry or sol. In traditional stereolithography, a digital object file is sliced into cross-sections, which are then used to illuminate each layer with a pause for motion in between each illumination step. Ceramic composite parts build this way are often post-processed to achieve a solid ceramic, but the layer-wise construction method has been found to leave optical artifacts detectable in the interior of the final part. An alternative approach to layer-wise stereolithography is to build a part continuously. The same slicing of a digital object into two-dimensional cross-sections is done, but the layers are illuminated without significant pauses between them. By (essentially) continuously moving the part away from the light source, it has been discovered that a part without optical artifacts in its interior can be fabricated. Rather than rely on layer thicknesses, the speed at which the forming part is moved dictates the height of the part. In at least certain embodiments of a continuous method, a final ceramic part is formed that does not have optical artifacts present in its bulk from distinct layers as typically seen in traditional stereolithography.

Glossary:

As used herein, "ceramic" or "ceramic article" includes amorphous material, glass, crystalline ceramic, glass-ceramic, and combinations thereof, and refers to non-metallic materials produced by application of heat. Ceramics are usually classified as inorganic materials. The term "amorphous material" refers to material that lacks long range crystal structure as determined by X-ray diffraction and/or has an exothermic peak corresponding to the crystallization of the amorphous material as determined by DTA (differential thermal analysis). The term "glass" refers to amorphous material exhibiting a glass transition temperature. The term "glass-ceramic" refers to ceramics comprising crystals formed by heat-treating amorphous material. The term "crystalline ceramic" refers to a ceramic material exhibiting a discernible X-ray powder diffraction pattern. "Crystalline" means a solid composed of atoms arranged in a pattern periodic in three dimensions (i.e., has long-range crystal structure, which may be determined by techniques such as X-ray diffraction). A "crystallite" means a crystalline domain of a solid having a defined crystal structure. A crystallite can only have one crystal phase.

As used herein, "ceramic particle" includes particles of amorphous material, glass, crystalline ceramic, glass-ceramic, and combinations thereof, and refers to non-metallic materials produced by application of heat or made by a chemical synthesis process. Ceramic particles are usually classified as inorganic materials. The term "amorphous material" with respect to ceramic particles refers to a material derived from a melt and/or a vapor phase as well as a material made from chemical synthesis, wherein the material lacks long range crystal structure as determined by X-ray diffraction and/or has an exothermic peak corresponding to the crystallization of the amorphous material as determined by DTA (differential thermal analysis). For instance, amorphous silica nanoparticles may be generated by condensation of silanes to form the nanoparticles.

As used herein, "additive manufacturing" means processes used to make 3-dimensional articles. An example of an additive manufacturing technique is stereolithography (SLA), in which successive layers of material are laid down under computer control. The articles can be of almost any shape or geometry and are produced from a 3-dimensional model or other electronic data source.

As used herein, "continuous" with respect to additive manufacturing processes describes a process whereby photopolymerizable liquid flows across the surface of a gradient of cured material and is polymerized by patterned light without the formation of a discrete layer, and means that the manufacturing may not be constantly continuous and can encompass brief pauses that may occur due to changing the irradiation pattern (e.g., related to frame rate of switching a sequence of projected two-dimensional image) on a photopolymerizable slurry or sol, due to small step-wise movement of a build plate through the material, or both. Stated another way, continuous additive manufacturing processes according to the present disclosure form a gelled article at a rate of 0.5 millimeters per minute (mm/min) or greater in a build axis, 0.6 mm/min, 0.7 mm/min, 0.8 mm/min, 0.9 mm/min, or 1.0 mm/min or greater in a build axis, with discrete steps of smaller than 5 micrometers, smaller than 4 micrometers, smaller than 3 micrometers, smaller than 2 micrometers, or smaller than 1 micrometer. In contrast, conventional layer by layer additive manufacturing is typically a cyclic process whereby photopolymerizable liquid flows across the surface and is polymerized by patterned light into a uniform gel layer prior to the application of additional liquid across the polymerized gel layer. The gel strength of the half layer furthest from the light source is within 20% of the gel strength of the half layer nearest the light, and the process forms a gelled article at a rate of 0.25 mm/min or less in a build axis or 0.20 mm/min or less in a build axis.

As used herein, "sol" refers to a continuous liquid phase containing discrete particles having sizes in a range from 1 nanometer (nm) to 100 nm.

As used herein, "slurry" refers to a continuous liquid phase containing discrete particles having sizes in a range from greater than 100 nm to 50 micrometers or from greater than 100 nm to 10 micrometers. A slurry may optionally further contain discrete particles having sizes in a range from 1 nanometer (nm) to 100 nm.

As used herein, "machining" refers to milling, grinding, cutting, carving, or shaping a material by a machine. Milling is usually faster and more cost effective than grinding. A "machinable article" is an article having a 3-dimensional shape and having sufficient strength to be machined.

As used herein, a "powder" refers to a dry, bulk material composed of a large number of fine particles that may flow freely when shaken or tilted.

As used herein, a "particle" refers to a substance being a solid having a shape which can be geometrically determined. The shape can be regular or irregular. Particles can typically be analyzed with respect to e.g., particle size and particle size distribution. A particle can comprise one or more crystallites. Thus, a particle can comprise one or more crystal phases.

As used herein, "associated" refers to a grouping of two or more primary particles that are aggregated and/or agglomerated. Similarly, the term "non-associated" refers to two or more primary particles that are free or substantially free from aggregation and/or agglomeration.

As used herein, "aggregation" refers to a strong association of two or more primary particles. For example, the primary particles may be chemically bound to one another. The breakdown of aggregates into smaller particles (e.g., primary particles) is generally difficult to achieve.

As used herein, "agglomeration" refers to a weak association of two or more primary particles. For example, particles may be held together by charge or polarity. The breakdown of agglomerates into smaller particles (e.g., primary particles) is less difficult than the breakdown of aggregates into smaller particles.

As used herein, "primary particle size" refers to the size of a non-associated single crystalline or single amorphous ceramic particle, which is considered to be a primary particle. X-ray diffraction (XRD) for crystalline particles and transmission electron microscopy (TEM) for amorphous particles are typically used to measure the primary particle size.

As used herein, "essentially spherical" means that the shape of the particles is close to a sphere. It does not contain sharp edges, which may result from a milling process.

As used herein, "soluble" means that a component (e.g., a solid) can be completely dissolved within a solvent. That is, the substance is able to form individual molecules (like glucose) or ions (like sodium chloride) when dispersed in water at 23° C. The solubilization process, however, might take some time, e.g. stirring the component over a couple of hours (e.g., 10 to 20 hours) might be required.

As used herein, "density" means the ratio of mass to volume of an object. The unit of density is typically grams per cubic centimeter ($g/cm^3$). The density of an object can be calculated e.g., by determining its volume (e.g., by calculation or applying the Archimedes principle or method) and measuring its mass. The volume of a sample can be determined based on the overall outer dimensions of the sample. The density of the sample can be calculated from the measured sample volume and the sample mass. The total volume of a material sample can be calculated from the mass of the sample and the density of the used material. The total volume of cells in the sample is assumed to be the remainder of the sample volume (100% minus the total volume of material).

As used herein, "theoretical density" refers to the maximum possible density that would be obtained in a sintered article if all pores were removed. The percent of the theoretical density for a sintered article can be determined, for example, from electron micrographs of a cross-section of the sintered article. The percent of the area of the sintered article in the electron micrograph that is attributable to pores can be calculated. Stated differently, the percent of the theoretical density can be calculated by subtracting the percent voids from 100 percent. That is, if 1 percent of the area of the electron micrograph of the sintered article is attributable to pores, the sintered article is considered to have a density equal to 99 percent of the theoretical density. The density can also be determined by the Archimedes method.

As used herein, "porous material" refers to a material comprising a partial volume that is formed by voids, pores, or cells in the technical field of ceramics. Accordingly, an "open-celled" structure of a material sometimes is referred to as "open-porous" structure, and a "closed-celled" material structure sometimes is referred to as a "closed-porous" structure. It may also be found that instead of the term "cell" sometimes "pore" is used in this technical field. The material structure categories "open-celled" and "closed-celled" can be determined for different porosities measured on different material samples (e.g., using a mercury "Poremaster 60-GT" from Quantachrome Inc., USA) according to DIN 66133. A material having an open-celled or open-porous structure can be passed through by e.g., gases.

As used herein, "heat treating", "calcining", "binder burn out", or "debindering" refers to a process of heating solid material to drive off at least 90 percent by weight of volatile chemically bound components (e.g., organic components) (versus, for example, drying, in which physically bonded water is driven off by heating). Heat treating is done at a temperature below a temperature needed to conduct a sintering step.

As used herein, "sintering" and "firing" are used interchangeably. A porous (e.g., pre-sintered) ceramic article shrinks during a sintering step, that is, if an adequate temperature is applied. The sintering temperature to be applied depends on the ceramic material chosen. Sintering typically includes the densification of a porous material to a less porous material (or a material having less cells) having a higher density, in some cases sintering may also include changes of the material phase composition (for example, a partial conversion of an amorphous phase toward a crystalline phase).

As used herein, "gel", "gelled article", and "gelled body" are used interchangeably and mean a three-dimensional gel resulting from the curing reaction of polymerizable components contained in a slurry or sol, including organic binder and solvent.

As used herein, "aerogel" means a three-dimensional low-density solid. An aerogel is a porous material derived from a gel, in which the liquid component of the gel has been replaced with a gas. The solvent removal is often done under supercritical conditions. During this process the network does not substantially shrink and a highly porous, low-density material can be obtained.

As used herein, "xerogel" refers to a three-dimensional solid derived from a gel, in which the liquid component of the gel has been removed by evaporation under ambient conditions or at an elevated temperature.

As used herein, "green body" means an un-sintered ceramic item, typically having an organic binder present.

As used herein, "white body" and "porous ceramic article" are interchangeable and refer to an item that has had the binder burned out or to a pre-sintered ceramic item.

As used herein, a "pre-sintered" ceramic item is an item that has had solvent and binder removed and exhibits a density of lower than 93% of its theoretical density.

As used herein, "geometrically defined article" means an article the shape of which can be described with geometrical terms including 2-dimensional terms like circle, square, rectangle, and 3-dimensional terms like layer, cube, cuboid, sphere.

As used herein, "isotropic linear sintering behavior" means that the sintering of a porous body during the sintering process occurs essentially invariant with respect to the directions x, y and z. "Essentially invariant" means that the difference in sintering behavior with respect to the directions x, y and z is in a range of not more than about +/−5% or +/−2% or +/−1%.

As used herein, the term "crack" refers to a material segregation or partitioning (i.e., defect) that is a ratio equal to at least 5:1, at least 6:1, at least 7:1, at least 8:1, at least 10:1, at least 12:1, or at least 15:1 in any two dimensions.

The term "mass inertial force" as referred to herein may be specified as force per unit mass and therefore may be specified in the unit $m/s^2$. Further, the mass inertial force can be expressed by the G-force which is a factor of the acceleration of gravity. For the purposes of the present specification, the acceleration of gravity is 9.81 m/s². Consequently, for example, a mass inertial force of 9.81 m/s² can be expressed as 1 G.

As used herein, a "dental article" means any article which can or is to be used in the dental or orthodontic field, especially for producing of or as dental restoration, a tooth model and parts thereof.
Examples of dental articles include crowns (including monolithic crowns), bridges, inlays, onlays, veneers, facings, copings, crown and bridged framework, implants, abutments, orthodontic appliances (e.g. brackets, buccal tubes, cleats and buttons) and parts thereof. The surface of a tooth is considered not to be a dental article.

As used herein, a "dental mill blank" refers to a solid block (3-dim article) of material from which a dental article, dental workpiece, dental support structure or dental restoration can be machined in any subtractive process, e.g., besides milling also by grinding, drilling, etc. A dental mill blank may have a size of about 20 mm to about 30 mm in two dimensions, for example may have a diameter in that range, and may be of a certain length in a third dimension. A blank for making a single crown may have a length of about 15 mm to about 30 mm, and a blank for making bridges may have a length of about 40 mm to about 80 mm. A typical size of a blank as it is used for making a single crown has a diameter of about 24 mm and a length of about 19 mm. Further, a typical size of a blank as it is used for making bridges has a diameter of about 24 mm and a length of about 58 mm. Besides the above mentioned dimensions, a dental mill blank may also have the shape of a cube, a cylinder or a cuboid. Larger mill blanks may be advantageous if more than one crown or bridge should be manufactured out of one blank. For these cases, the diameter or length of a cylindric or cuboid shaped mill blank may be in a range of about 100 mm to about 200 mm, with a thickness being in the range of about 10 mm to about 30 mm.

A material or composition is "essentially free" or "substantially free" of a certain component within the meaning of the invention, if the material or composition does not contain said component as an essential feature. Thus, said component is not willfully added to the composition or material either as such or in combination with other components or ingredient of other components. A composition or material being essentially free of a certain component usually contains the component in an amount of less than about 1 wt. %, or less than about 0.1 wt. %, or less than about 0.01 wt. % (or less than about 0.05 mol/l solvent, or less than about 0.005 mol/l solvent, or less than about 0.0005 mol/l solvent) with respect to the whole composition or material. Ideally the composition or material does not contain the said component at all. However, sometimes the presence of a small amount of the said component is not avoidable e.g., due to impurities.

As used herein, "aliphatic group" means a saturated or unsaturated linear, branched, or cyclic hydrocarbon group. This term is used to encompass alkyl, alkenyl, and alkynyl groups, for example.

As used herein, "alkyl" means a linear or branched, cyclic or acyclic, saturated monovalent hydrocarbon having from one to thirty-two carbon atoms, e.g., methyl, ethyl, 1-propyl, 2-propyl, pentyl, and the like.

As used herein, "alkylene" means a linear saturated divalent hydrocarbon having from one to twelve carbon atoms or a branched saturated divalent hydrocarbon radical having from three to twelve carbon atoms, e.g., methylene, ethylene, propylene, 2-methylpropylene, pentylene, hexylene, and the like.

As used herein, "alkenyl" refers to a monovalent linear or branched unsaturated aliphatic group with one or more carbon-carbon double bonds, e.g., vinyl. Unless otherwise indicated, the alkenyl groups typically contain from one to twenty carbon atoms.

As used herein, "hardenable" refers to a material or composition that can be cured or solidified, e.g., by heating to remove solvent, heating to cause polymerization, chemical crosslinking, radiation-induced polymerization or crosslinking, or the like.

As used herein, "curing" means the hardening or partial hardening of a composition by any mechanism, e.g., by heat, light, radiation, e-beam, microwave, chemical reaction, or combinations thereof.

As used herein, "cured" refers to a material or composition that has been hardened or partially hardened (e.g., polymerized or crosslinked) by curing.

As used herein, "integral" refers to being made at the same time or being incapable of being separated without damaging one or more of the (integral) parts, e.g., "unitary".

As used herein, the term "(meth)acrylate" is a shorthand reference to acrylate, methacrylate, or combinations thereof, "(meth)acrylic" is a shorthand reference to acrylic, methacrylic, or combinations thereof, and "(meth)acryl" is a shorthand reference to acryl and methacryl groups. "Acryl" refers to derivatives of acrylic acid, such as acrylates, methacrylates, acrylamides, and methacrylamides. By "(meth)acryl" is meant a monomer or oligomer having at least one acryl or methacryl groups, and linked by an aliphatic segment if containing two or more groups. As used herein, "(meth)acrylate-functional compounds" are compounds that include, among other things, a (meth)acrylate moiety.

As used herein, "non-crosslinkable" refers to a polymer that does not undergo crosslinking when exposed to actinic radiation or elevated heat. Typically, non-crosslinkable polymers are non-functionalized polymers such that they lack functional groups that would participate in crosslinking.

As used herein, "polymerizable slurry or sol" and "polymerizable composition" each mean a hardenable composition that can undergo polymerization upon initiation (e.g., free-radical polymerization initiation). Typically, prior to polymerization (e.g., hardening), the polymerizable slurry/sol or composition has a viscosity profile consistent with the requirements and parameters of one or more additive manufacturing (e.g., 3D printing) systems. In some embodiments, for instance, hardening comprises irradiating with actinic radiation having sufficient energy to initiate a polymerization or cross-linking reaction, for a "photopolymerizable slurry or sol". For instance, in some embodiments, ultraviolet (UV) radiation, visible radiation, e-beam radiation, or a combination, can be used.

As used herein, a "resin" contains all polymerizable components (monomers, oligomers and/or polymers) being present in a hardenable slurry/sol or composition. The resin may contain only one polymerizable component compound or a mixture of different polymerizable compounds.

As used herein, "sintered article" refers to a gelled article that has been dried, heated to remove the organic matrix, and then further heated to reduce porosity and to densify. The density after sintering is at least 40 percent of the theoretical density. Articles having a density in a range of 40 to 93 percent of the theoretical density typically have open porosity (pores open to surface). Above 93 percent or 95 percent of the theoretical density, there are typically closed pores (no pores open to the surface).

As used herein, "thermoplastic" refers to a polymer that flows when heated sufficiently above its glass transition point and become solid when cooled.

As used herein, "thermoset" refers to a polymer that permanently sets upon curing and does not flow upon subsequent heating. Thermoset polymers are typically cross-linked polymers.

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the disclosure.

In this application, terms such as "a", "an", and "the" are not intended to refer to only a singular entity, but include the general class of which a specific example may be used for illustration. The terms "a", "an", and "the" are used interchangeably with the term "at least one." The phrases "at least one of and" comprises at least one of followed by a list refers to any one of the items in the list and any combination of two or more items in the list.

As used herein, the term "or" is generally employed in its usual sense including "and/of" unless the content clearly dictates otherwise. The term "and/or" means one or all of the listed elements or a combination of any two or more of the listed elements.

Also herein, all numbers are assumed to be modified by the term "about" and preferably by the term "exactly." As used herein in connection with a measured quantity, the term "about" refers to that variation in the measured quantity as would be expected by the skilled artisan making the measurement and exercising a level of care commensurate with the objective of the measurement and the precision of the measuring equipment used. Also herein, the recitations of numerical ranges by endpoints include all numbers subsumed within that range as well as the endpoints (e.g., 1 to 5 includes 1, 1.5, 2, 2.75, 3, 3.80, 4, 5, etc.).

As used herein as a modifier to a property or attribute, the term "generally", unless otherwise specifically defined, means that the property or attribute would be readily recognizable by a person of ordinary skill but without requiring absolute precision or a perfect match (e.g., within +/−20% for quantifiable properties). The term "substantially", unless otherwise specifically defined, means to a high degree of approximation (e.g., within +/−10% for quantifiable properties) but again without requiring absolute precision or a perfect match. Terms such as same, equal, uniform, constant, strictly, and the like, are understood to be within the usual tolerances or measuring error applicable to the particular circumstance rather than requiring absolute precision or a perfect match.

In a first aspect, the present disclosure provides an additive manufacturing method of making a ceramic article. The method comprises:
a) obtaining a photopolymerizable slurry or sol comprising a plurality of ceramic particles distributed in the photopolymerizable slurry or sol;
b) selectively polymerizing the photopolymerizable slurry or sol using actinic radiation and continuous movement of a build substrate through the photopolymerizable slurry or sol to form a gelled article;
c) extracting solvent from the gelled article to form an aerogel article or a xerogel article;
d) heat treating the aerogel article or the xerogel article to form a porous ceramic article; and
e) sintering the porous ceramic article to form a sintered ceramic article;
    wherein the sintered ceramic article exhibits a density of 94% or greater with respect to a theoretical density of the ceramic material.

Stated another way, and referring to FIG. 1, a method of making a ceramic article includes the step 110 of obtaining a photopolymerizable slurry or sol and the step 120 of selectively curing (e.g., polymerizing) the photopolymerizable slurry or sol to obtain a gelled article using actinic radiation and continuous movement of a (e.g., build) substrate through the photopolymerizable slurry or sol. The photopolymerizable slurry or sol is typically introduced into a reservoir, cartridge, or other suitable container for use by or in an additive manufacturing device. The additive manufacturing device selectively cures the photopolymerizable slurry or sol according to a set of computerized design instructions.

Referring again to FIG. 1, the method further includes either the step 140a of extracting solvent from (e.g., drying) the gelled article to form an aerogel article or the step 140b of extracting solvent from the gelled article to form a xerogel article. Optionally, the solvent extraction is performed by applying a supercritical fluid drying step. The method further includes either the step 150a of heat treating the aerogel article to form a porous ceramic article or the step 150b of heat treating the xerogel article to form a porous ceramic article; as well as the step 160 of sintering the porous ceramic article to obtain a sintered ceramic article. The photopolymerizable slurry or sol includes ceramic particles distributed in the photopolymerizable slurry or sol, which often comprises at least one radiation curable monomer, a solvent, a photoinitiator, and an inhibitor.

Additionally, it is to be understood that methods of manufacturing a 3D article described herein can include so-called "stereolithography/vat polymerization" 3D printing methods, and the selective curing step may employ stereolithographic printing. Other techniques for three-dimensional manufacturing are known, and may be suitably adapted to use in the applications described herein. More generally, three-dimensional fabrication techniques continue to become available. All such techniques may be adapted to use with photopolymerizable slurries and sols described herein, provided they offer compatible fabrication viscosities and resolutions for the specified article properties. Fabrication may be performed using any of the fabrication technologies described herein, either alone or in various combinations, using data representing a three-dimensional object, which may be reformatted or otherwise adapted as necessary for a particular printing or other fabrication technology.

Data representing an article (e.g., gelled article) may be generated using computer modeling, such as computer aided design (CAD) data. Image data representing the article design can be exported in STL format, or in any other suitable computer processable format, to the additive manufacturing equipment. Scanning methods to scan a three-dimensional object may also be employed to create the data representing the article. One exemplary technique for acquiring the data is digital scanning. Any other suitable scanning technique may be used for scanning an article, including X-ray radiography, laser scanning, computed tomography (CT), magnetic resonance imaging (MRI), and ultrasound imaging. Other possible scanning methods are described, e.g., in U.S. Patent Application Publication No. 2007/0031791 (Cinader, Jr., et al.). The initial digital data set, which may include both raw data from scanning operations and data representing articles derived from the raw data, can be processed to segment an article design from any surrounding structures (e.g., a support for the article).

Figure 10:
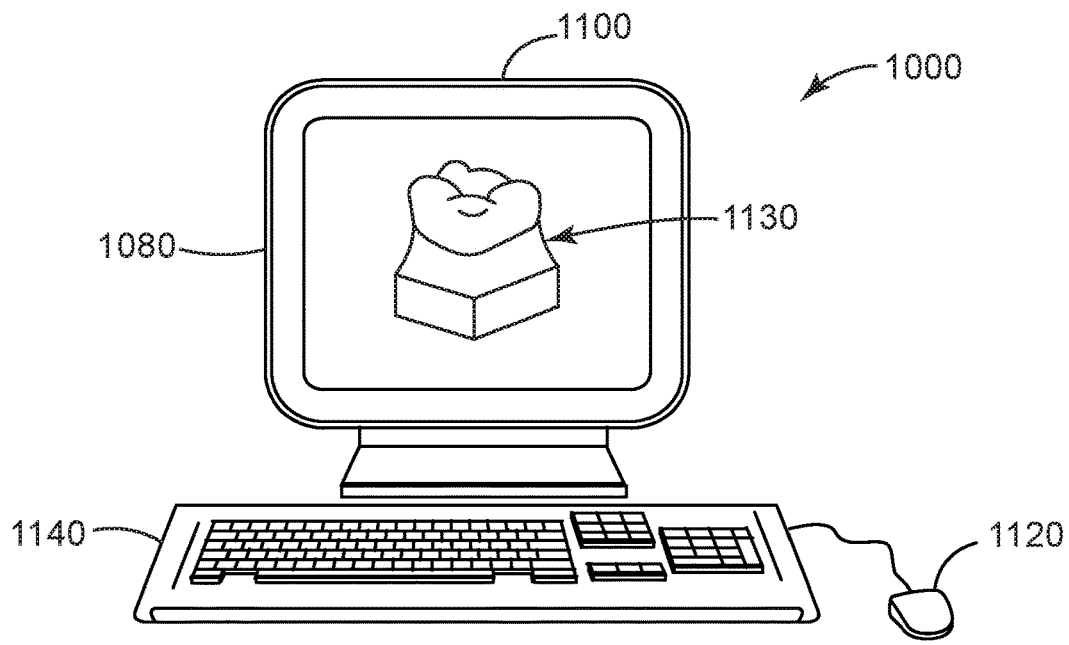
FIG. 10 is a schematic front view of an exemplary computing device 1000.

Often, machine-readable media are provided as part of a computing device. The computing device may have one or more processors, volatile memory (RAM), a device for reading machine-readable media, and input/output devices, such as a display, a keyboard, and a pointing device. Further, a computing device may also include other software, firmware, or combinations thereof, such as an operating system and other application software. A computing device may be, for example, a workstation, a laptop, a personal digital assistant (PDA), a server, a mainframe or any other general-purpose or application-specific computing device. A computing device may read executable software instructions from a computer-readable medium (such as a hard drive, a CD-ROM, or a computer memory), or may receive instructions from another source logically connected to computer, such as another networked computer. Referring to FIG. 10, a computing device 1000 often includes an internal processor 1080, a display 1100 (e.g., a monitor), and one or more input devices such as a keyboard 1140 and a mouse 1120. In FIG. 10, a gelled article 1130 is shown on the display 1100.

Figure 6:
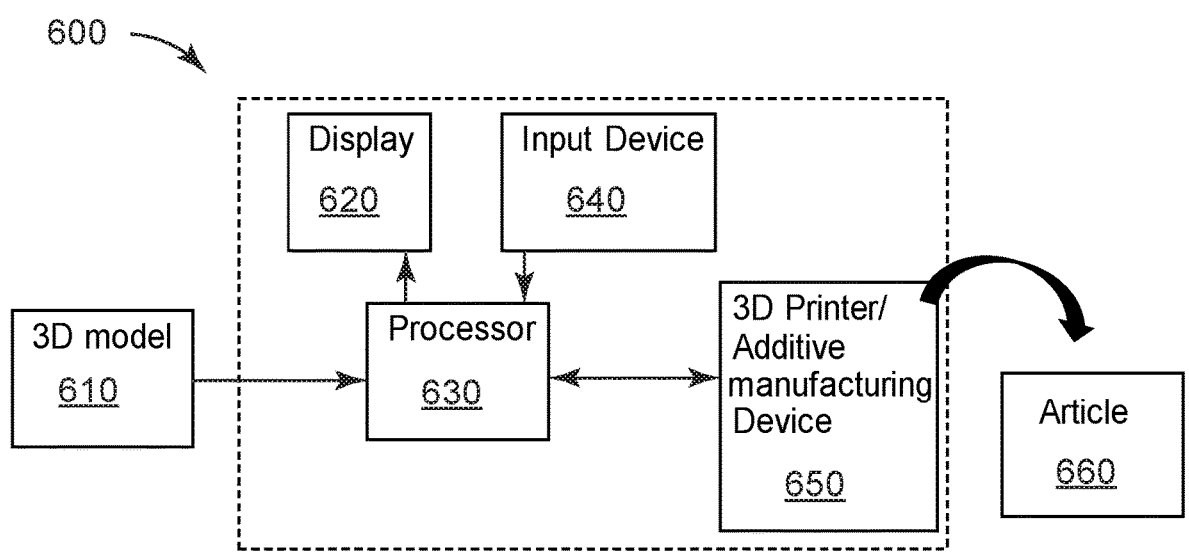
FIG. 6 is a block diagram of a generalized system 600 for additive manufacturing of an article.

Referring to FIG. 6, in certain embodiments, the present disclosure provides a system 600. The system 600 comprises a display 620 that displays a 3D model 610 of an article (e.g., a gelled article 1130 as shown on the display 1100 of FIG. 10); and one or more processors 630 that, in response to the 3D model 610 selected by a user, cause a 3D printer/additive manufacturing device 650 to create a physical object of the article 660. Often, an input device 640 (e.g., keyboard and/or mouse) is employed with the display 620 and the at least one processor 630, particularly for the user to select the 3D model 610. The article 660 comprises a gelled article obtained by selectively curing a photopolymerizable slurry or sol. The photopolymerizable slurry or sol typically includes ceramic particles; at least one radiation curable monomer; a solvent; a photoinitiator; and an inhibitor. The components of ceramic particles, radiation curable monomer, solvent, photoinitiator, and inhibitor, are as discussed in detail below.

Figure 7:
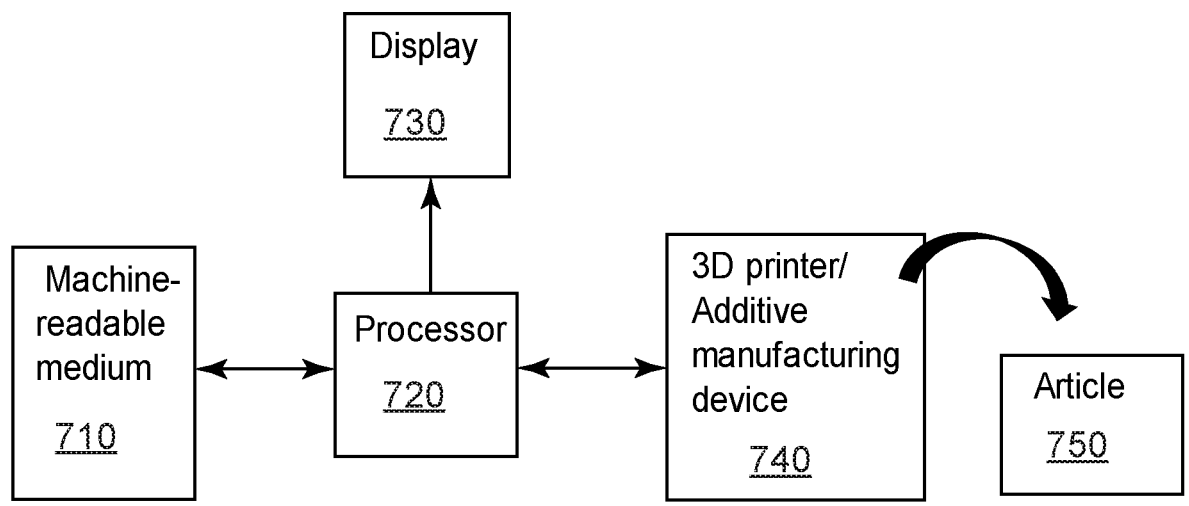
FIG. 7 is a block diagram of a generalized manufacturing process for an article.

Referring to FIG. 7, a processor 720 (or more than one processor) is in communication with each of a machine-readable medium 710 (e.g., a non-transitory medium), a 3D printer/additive manufacturing device 740, and optionally a display 730 for viewing by a user. The 3D printer/additive manufacturing device 740 is configured to make one or more articles 750 based on instructions from the processor 720 providing data representing a 3D model of the article 750 (e.g., a gelled article 1130 as shown on the display 1100 of FIG. 10) from the machine-readable medium 710.

Figure 8:
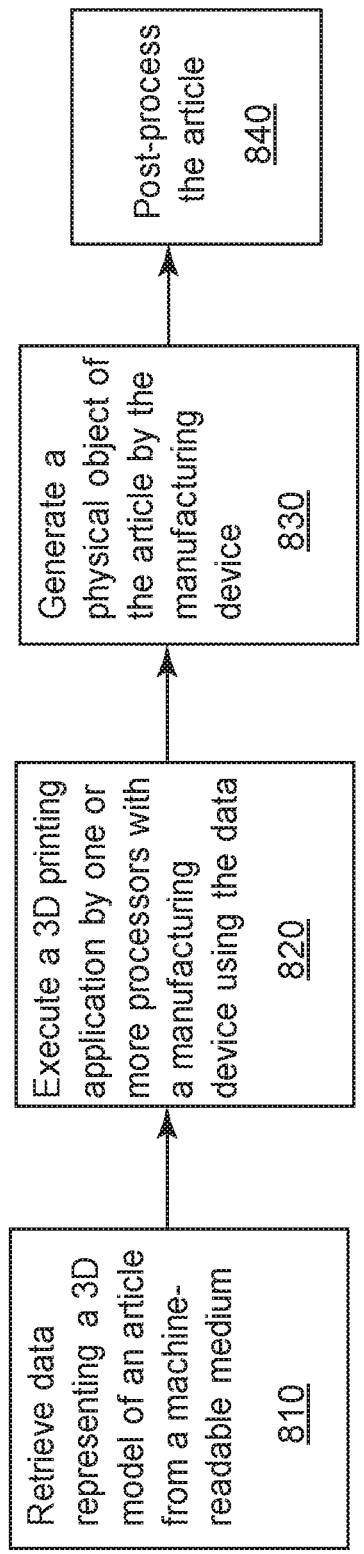
FIG. 8 is a high-level flow chart of an exemplary article manufacturing process.

Referring to FIG. 8, for example and without limitation, an additive manufacturing method comprises retrieving 810, from a (e.g., non-transitory) machine-readable medium, data representing a 3D model of an article (e.g., a gelled article) according to at least one embodiment of the present disclosure. The method further includes executing 820, by one or more processors, an additive manufacturing application interfacing with a manufacturing device using the data; and generating 830, by the manufacturing device, a physical object of the article. The additive manufacturing equipment can selectively cure a photopolymerizable slurry or sol to form a gelled article. The photopolymerizable slurry or sol typically includes ceramic particles; at least one radiation curable monomer; a solvent; a photoinitiator; and an inhibitor. The components of ceramic particles, radiation curable monomer, solvent, photoinitiator, and inhibitor, are as discussed in detail below. One or more various optional post-processing steps 840 may be undertaken. Typically, the gelled article is dried, heat treated, and sintered to form a ceramic article.

Figure 9:
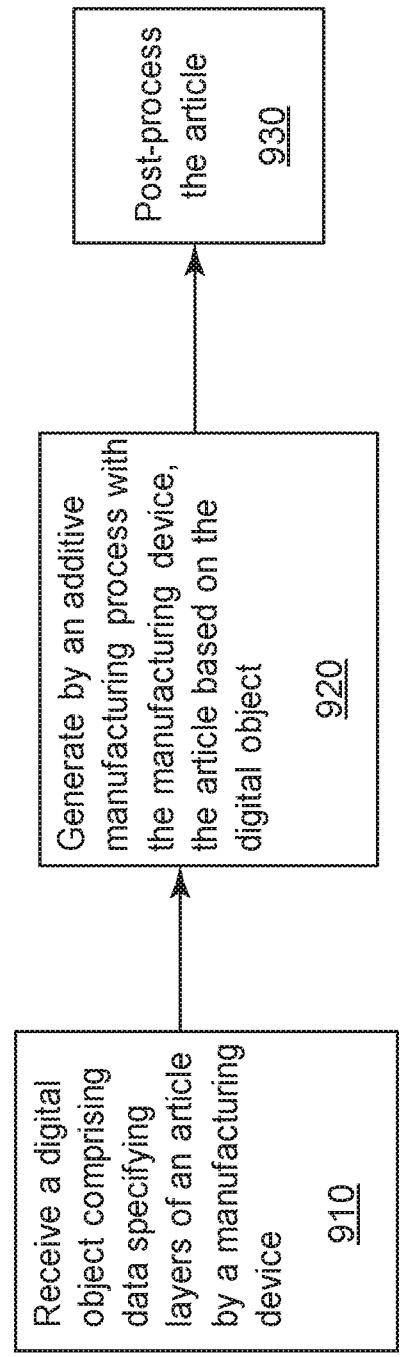
FIG. 9 is a high-level flow chart of an exemplary article additive manufacturing process.

Additionally, referring to FIG. 9, a method of making an article comprises receiving 910, by a manufacturing device having one or more processors, a digital object comprising data specifying a (e.g., gelled) article; and generating 920, with the manufacturing device by an additive manufacturing process, the article based on the digital object. Again, the article may undergo one or more steps of post-processing 930.

Preferably, vat (co)polymerization with a two-dimensional cross section projection is employed in methods according to the present disclosure. This technology also includes a container of curable slurry or sol (e.g., photopolymerizable composition). However, a two-dimensional cross section is projected onto the curable composition by a computer controlled digital light processing ("DLP"), liquid crystal display (LCD), laser scanning system, or a photomask, or the like, to cure the desired section of an entire plane transverse to the projected beam at one time. Continuous printing in machines with these basic printer configurations is enabled, for example, by projecting a continuous series of cross-sectional images onto the vat while (e.g., essentially) continuously advancing the build platform away from the surface of the polymerizing liquid such that additional liquid photopolymerizable composition is drawn into the build area during the polymerization process.

A two-dimensional pattern either blocks actinic irradiation from passing through all of the regions of the exposure image except for the pattern (e.g., as with a combination of light source and photomask), or provides actinic irradiation in the shape of the pattern (e.g., as with a laser or an array of pixels). When the exposure image includes a photomask, the positioning of the exposure image is typically a physical positioning of the photomask adjacent to the vat. In contrast, when the exposure image includes actinic irradiation in the shape of the pattern (e.g., via digital projection or laser scanning), the positioning of the exposure image is typically a positioning of the irradiation source, and the irradiation source is directed towards the vat.

Sequential cross-sections of the 3D article can be bonded or adhered to one another in the z-direction (or build direction corresponding to the direction of raising or lowering recited above) by the application of the energy for solidifying the photopolymerizable composition. Moreover, selectively applying energy to the photopolymerizable composition in the container can comprise applying actinic radiation, such as UV radiation, visible radiation, e-beam radiation, or any combination thereof, having a sufficient energy to cure the photopolymerizable composition. The skilled practitioner can select a suitable radiation source and range of wavelengths for a particular application without undue experimentation. In some embodiments, the actinic radiation provides a wavelength in a range from 220 nm to 550 nm. Optionally, the actinic radiation is provided at an intensity of 1 to 50 milliwatts per square centimeter (mW/$cm^2$).

It is to be understood that one or more steps of a method described herein, such as a step of selectively applying energy to a layer of photopolymerizable composition, can be carried out according to an image of the 3D article in a computer-readable format. In certain embodiments, an apparatus adapted to be used in a continuous mode may be employed, such as the ASIGA PICO PLUS 39, available from Asiga USA, Anaheim Hills, CA, or an apparatus commercially available from Carbon (Redwood City, CA), for instance as described in U.S. Pat. Nos. 9,205,601 and 9,360,757 (both to DeSimone et al.). Suitable commercially available continuous printers include the M2 from Carbon, the ProMaker L8000 from Prodways Technologies (Les Mureaux, France), the Vida UHD cDLM from EnvisionTEC Inc. (Dearborn, MI), and the FIG. 4 from 3D Systems (Rock Hill, SC). A suitable apparatus can also be assembled from individual components, for instance as described in the examples below.

Figure 2:
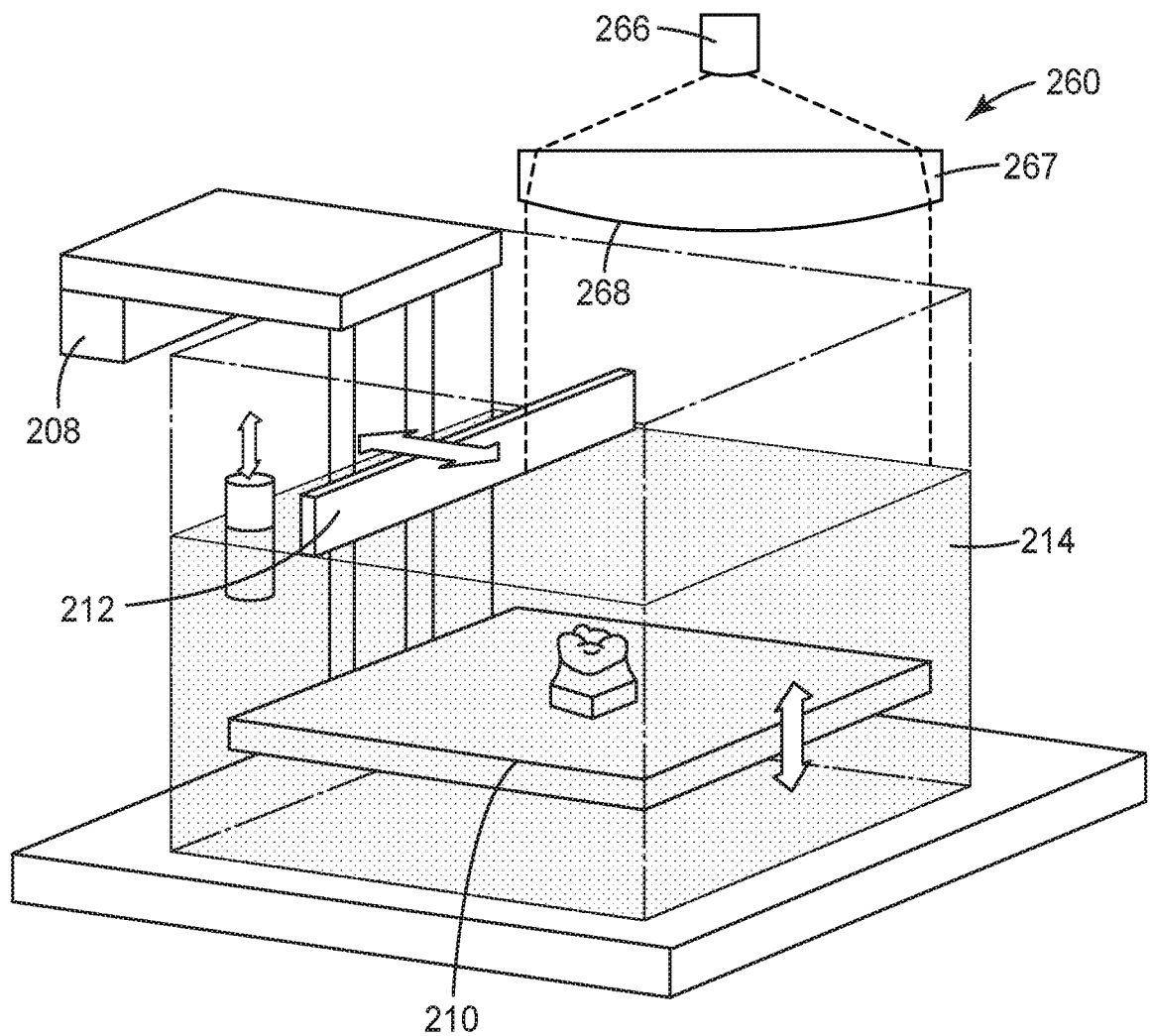
FIG. 2 is a generalized schematic of an apparatus for use in an embodiment of the present disclosure.

FIG. 2 shows an exemplary continuous stereolithography apparatus ("SLA") that may be used with the photopolymerizable slurry or sol and methods described herein. In general, the SLA 200 may include an irradiation source 260, optics 204, a steering lens 267, an elevator 208, a platform 210, and (optionally) a straight edge 212, within a vat 214 filled with the photopolymerizable slurry or sol. In operation, the irradiation source 260 cures a sequence of cross sections of the photopolymerizable slurry or sol while the elevator 208 continuously slowly lowers the platform 210 toward a floor of the vat 214. In such embodiments, the actinic radiation is directed at the photopolymerizable slurry or sol from above the photopolymerizable slurry or sol. In other embodiments, the vat 214 may be slowly filled with liquid resin while an article is drawn onto the top surface of the photopolymerizable slurry or sol. In some embodiments, the (e.g., build) platform 210 is moved at a rate of 0.5 millimeters per minute (mm/min) or greater in the build axis, 0.6 mm/min, 0.7 mm/min, 0.8 mm/min, or 0.9 mm/min or greater in the build axis; and 5 mm/min or less, 4.5 mm/min, 4.0 mm/min, 3.5 mm/min, 3.0 mm/min, 2.5 mm/min, 2.0 mm/min, or 1.5 mm/min or less in the build axis. Accordingly, in such embodiments a gelled article is formed at the same rate that the platform is moved.

In an embodiment, the irradiation source 260 may comprise a digital photomask (e.g., a LCD with a backlight 266), wherein the backlight comprises an LED or a lamp, for use in exemplary methods of the present disclosure. A lens 267 having a convex surface 268 is employed with the backlight 266 to diffuse the irradiation across at least a portion of the digital photomask. In an embodiment, the irradiation source 260 may comprise a physical photomask and an LED or lamp 266. A lens 267 having a convex surface 268 is employed with the LED or lamp 266 to diffuse the irradiation across at least a portion of the photomask.

DLPs are well-known in the art, for instance and without limitation, the apparatuses described in U.S. Pat. No. 5,658,063 (Nasserbakht), U.S. Pat. No. 5,905,545 (Poradish et al.), U.S. Pat. No. 6,587,159 (Dewald), U.S. Pat. No. 7,164,397 (Pettitt et al.), U.S. Pat. No. 7,360,905 (Davis et al.), U.S. Pat. No. 8,705,133 (Lieb et al.), and U.S. Pat. No. 8,820,944 (Vasquez). Suitable DLPs are commercially available, such as from Texas Instruments (Dallas, TX). As indicated above, either an LED or a lamp may be employed with a DLP. Suitable lamps may include a flash lamp, a low pressure mercury lamp, a medium pressure mercury lamp, and/or a microwave driven lamp. The skilled practitioner can select a suitable LED or lamp light source to provide the actinic radiation required to initiate polymerization for a particular polymerizable composition, for instance, the UV LED CBT-39-UV, available from Luminus Inc. (Sunnyvale, CA). Suitable photomasks are commercially available, for instance, NanoSculpt Photomasks from Infinite Graphics (Minneapolis, MN). Similar to using a DLP, either an LED or a lamp may be employed with a photomask A benefit of employing a digital photomask is that the individual pixels are readily adjustable (e.g., using computer controls) to change the irradiation location and dosage and thereby the shape of the resulting gel as needed without requiring a significant equipment alteration. Suitable LCDs are commercially available, for instance, the LCD LQ043T1DG28, available from Sharp Corporation (Osaka, Japan).

A method described herein can also comprise planarizing a new layer of fluid photopolymerizable composition provided by raising or lowering an elevator platform. Planarization in continuous methods is typically only carried out when different sections are being formed, in between curing the composition for distinct sections. Such planarization can be carried out, in some cases, by utilizing a wiper or roller or a recoater Planarization corrects the thickness of one or more fluid layers prior to curing the composition by evening the dispensed material to remove excess material and create a uniformly smooth exposed or flat up-facing surface on the support platform of the printer. Referring again to FIG. 2, if planarization is carried out between curing sections of an article, the straight edge 212 may sweep the surface of the cured composition to smooth and normalize the surface prior to addition of more photopolymerizable slurry or sol.

After the 3D article has been formed, it is typically removed from the additive manufacturing apparatus, and at least some uncured photopolymerizable slurry or sol is removed from the surface of the gelled article. Referring again to FIG. 1, the method optionally includes rinsing the gelled article, (e.g., an ultrasonic, or bubbling, or spray rinse) in a solvent, which would dissolve a portion of the uncured photopolymerizable slurry or sol but not the cured, solid state article (e.g., gel). In some embodiments, step 130 of the method comprises, (e.g., prior to step c), step f) of moving the gelled article and thereby generating a mass inertial force in uncured photopolymerizable composition disposed on the gelled article, thereby forming a coating layer of uncured photopolymerizable composition on the gelled article, wherein the mass inertial force is generated using a centrifuge, a shaker, or a mixer that spins along one or more axes. Suitable ways of generating a mass inertial force are described, for instance, in co-owned application Ser. No. 11/773,498, incorporated herein by reference in its entirety. For instance, the source of the mass inertial force may be generated using a centrifuge, a shaker, or a mixer that spins along one or more axes. In some embodiments, the moving of the object is a rotation or spinning of the object. Accordingly, the mass inertial force may be generated by a centrifugal force. One suitable mixer that spins along more than one axis is a dual asymmetric centrifugal mixer, such as the DAC 400 FVZ available from Flacktek (Landrum, SC). A dual asymmetric centrifugal mixer provides simultaneous dual axis spinning that automatically reorients the article during spinning, which tends to pull uncured composition out of concave features of the article in a short period of time (e.g., 20, 15, or 10 seconds or less). Any other conventional method for cleaning the article and removing uncured material at the article surface may also be utilized.

At this stage, the three-dimensional article typically has sufficient green strength for handling in the remaining steps of the method. A photopolymerizable slurry or sol described herein in a cured state (e.g., a gelled body), in some embodiments, can exhibit one or more desired properties. The article surface, as well as the bulk article itself, typically still retain uncured photopolymerizable slurry or sol, suggesting a need for further curing. Removing residual uncured photopolymerizable composition is particularly useful when the article is going to subsequently be post-cured, to minimize uncured residual photopolymerizable composition from undesirably curing directly onto the article. A photopolymerizable slurry or sol in a "cured" state can comprise a photopolymerizable composition that includes a polymerizable component that has been at least partially polymerized and/or crosslinked. For instance, in some instances, a gelled article is at least about 10% polymerized or crosslinked or at least about 30% polymerized or crosslinked. In some cases, a gelled article is at least about 50%, at least about 70%, at least about 80%, or at least about 90% polymerized or crosslinked. A gelled article can also be between about 10% and about 99% polymerized or crosslinked.

Further curing can be accomplished by further irradiating with actinic radiation, heating, or both. Optionally, that can be followed by soaking the gelled article with another solvent (e.g., diethylene glycol ethyl ether or ethanol). Exposure to actinic radiation can be accomplished with any convenient radiation source, generally UV radiation, visible radiation, and/or e-beam radiation, for a time ranging from about 10 seconds to over 60 minutes. Heating is generally carried out at a temperature in the range of about 35-80° C., for a time ranging from about 10 to over 60 minutes in an inert atmosphere. So called post-cure ovens, which combine UV radiation and thermal energy, are particularly well suited for use in the post-cure process(es). In general, post curing improves the mechanical properties and stability of the three-dimensional article relative to the same three-dimensional article that is not post cured.

Figure 3A:
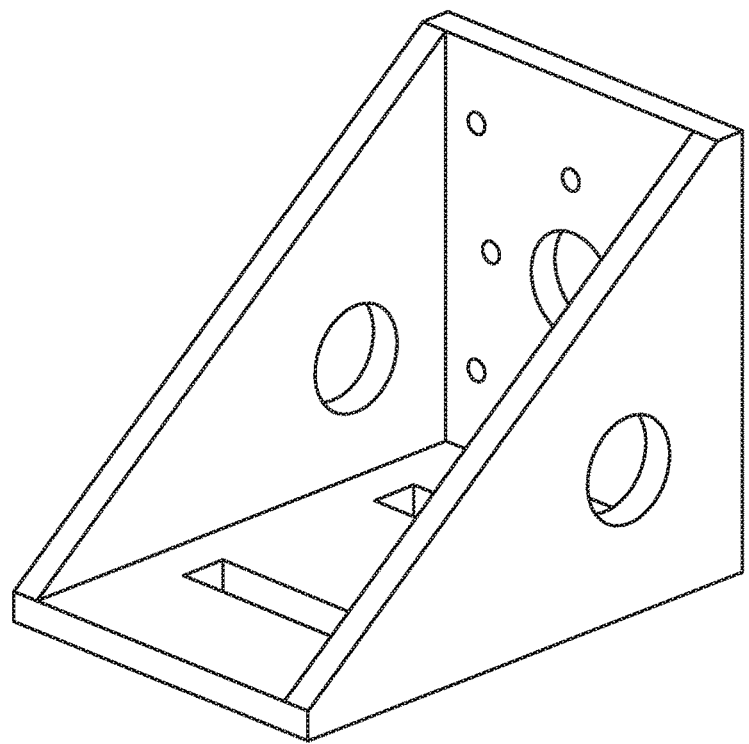
FIG. 3A is a perspective view of a digital file for an article having the shape of a ramp.
Figure 3B:
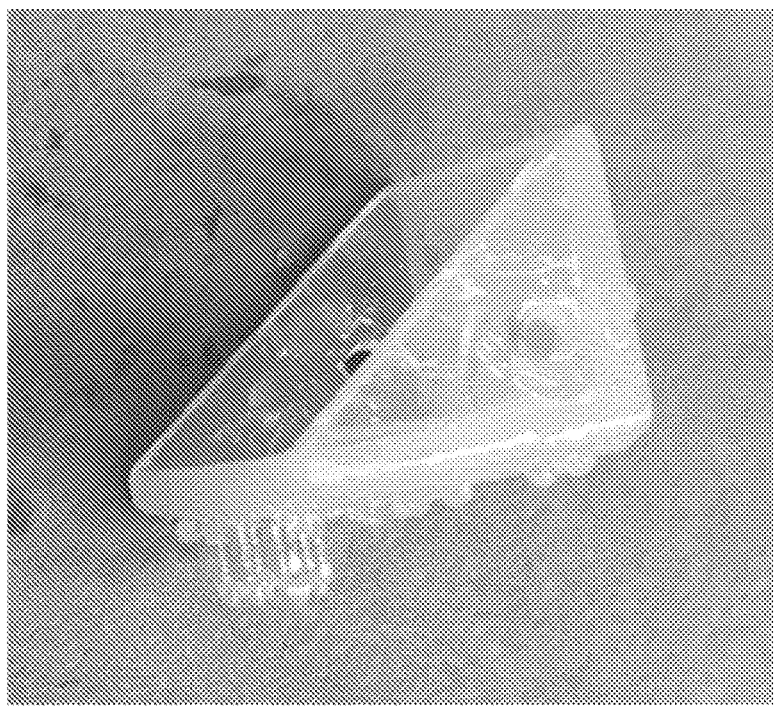
FIG. 3B is a perspective view of a gelled article, prepared according to one embodiment of the present disclosure using the digital file of FIG. 3A.

Referring to FIG. 3A, an image is shown of a digital file for an article having the shape of a ramp. FIG. 3B shows a gelled article of a ramp prepared according to an embodiment of the present disclosure using the digital file of FIG. 3A. The gelled article of FIG. 3B includes a plurality of support structures, which can be present in some embodiments of making gelled articles according to the present disclosure.

Figure 4A:
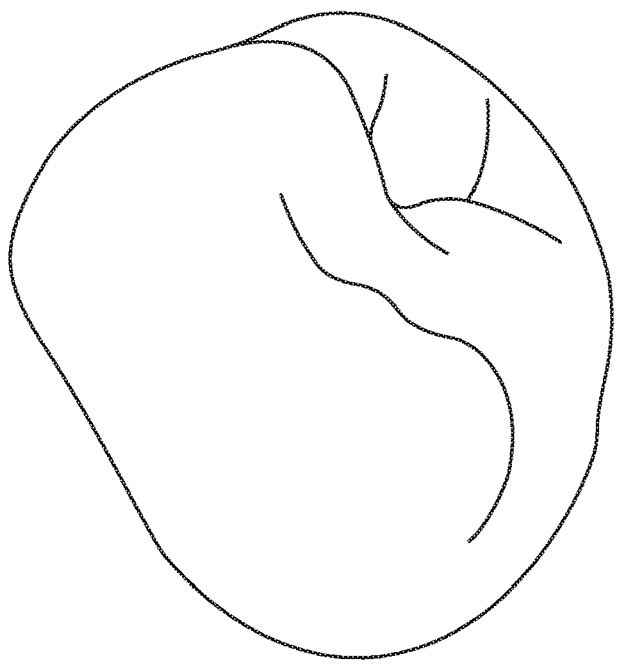
FIG. 4A is a perspective view of a digital file for an article having the shape of a dental crown.
Figure 4B:
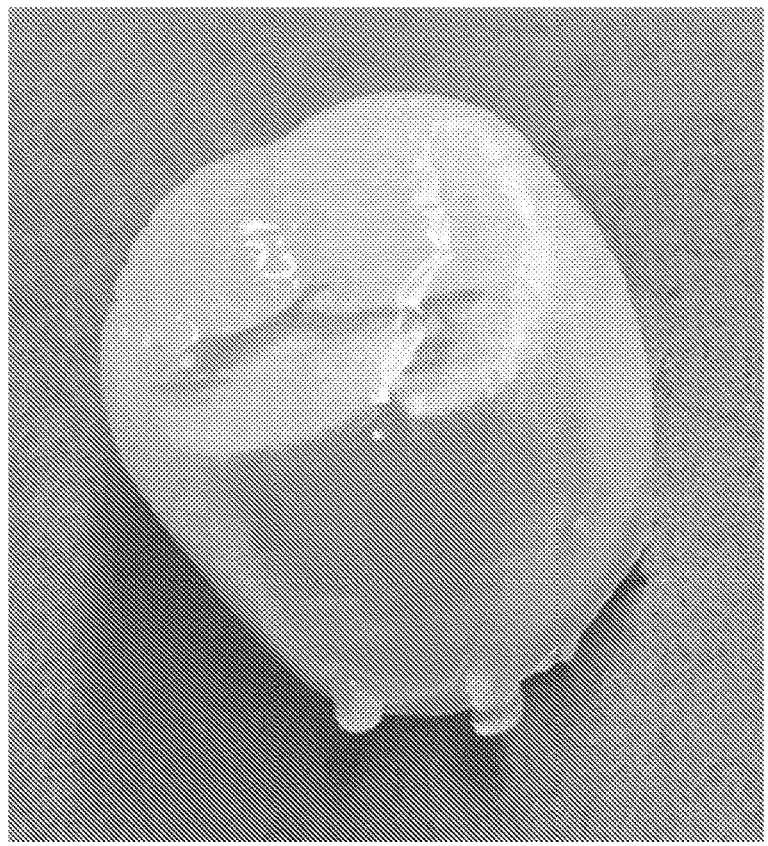
FIG. 4B is a perspective view of a gelled article, prepared according to one embodiment of the present disclosure using the digital file of FIG. 4A.
Figure 5:
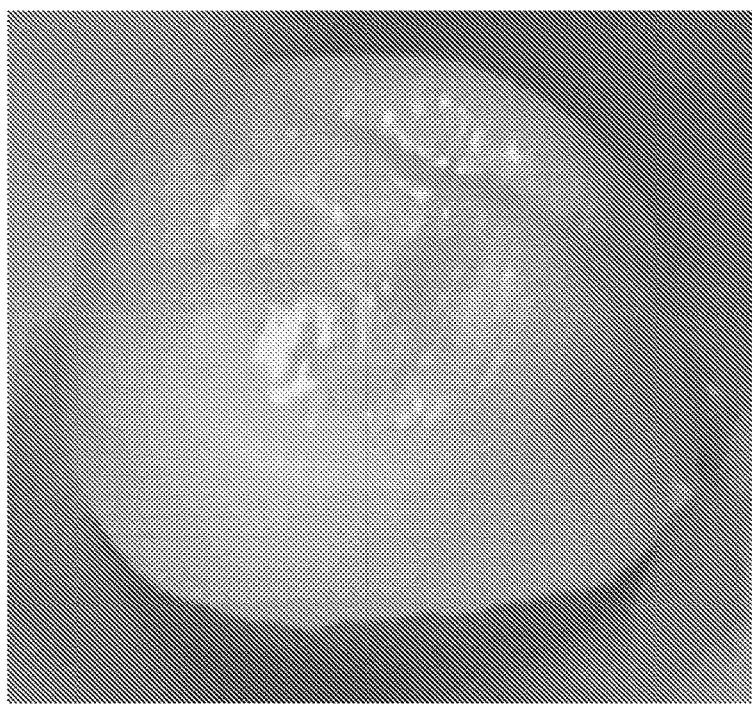
FIG. 5 is a perspective view of a ceramic article according to one embodiment of the present disclosure.

Referring to FIG. 4A, an image is shown of a digital file for an article having the shape of a dental crown. FIG. 4B shows a gelled article of a dental crown prepared according to an embodiment of the present disclosure using the digital file of FIG. 4A. The gelled article of FIG. 4B also includes a plurality of support structures. Referring to FIG. 5, a ceramic article is shown having a shape of a dental crown. The ceramic article has been post-processed after the additive manufacturing formation of a gelled article (e.g., including removing support structures from the gelled article).

The components of the photopolymerizable slurry or sol (e.g., ceramic particles, solvent, radiation curable monomer, photoinitiator, and inhibitor) are each discussed in detail below.

Ceramic Particles

The photopolymerizable compositions of the present disclosure include particles of at least one ceramic material. In many embodiments, the ceramic particles comprise metal oxide ceramic particles, non-oxide ceramic particles, or any combination thereof.

Preferably, the ceramic particles are selected from the group consisting of zirconia ($ZrO_2$), silica ($SiO_2$), alumina ($Al_2O_3$), yttria ($Y_2O_3$), ceria ($CeO_2$), magnesium-magnesia aluminate (MMA), magnesium oxide (MgO), hydroxyapatite ($Ca_5(PO_4)_3OH$), fluorapatite ($Ca_5(PO_4)_3F$), chlorapatite ($Ca_5(PO_4)_3Cl$), calcite ($CaCO_3$), cordierite ($Mg_2Al_4Si_5O_{18}$), silicon carbide (SiC), silicon nitride ($Si_3N_4$), boron carbide ($B_4C$), titanium diboride ($TiB_2$), zirconium diboride ($ZrB_2$), boron nitride (BN), titanium carbide (TiC), zirconium carbide (ZrC), aluminium nitride (AlN), calcium hexaboride ($CaB_6$), MAX phase ($M_{n+1}AX_n$), and any combination thereof. In select embodiments, high-purity particles are used, in which the total content of metal impurities is preferably less than 100 ppm, particularly preferably less than 50 ppm. In alternate embodiments, particles are used having a total content of metal impurities of about 2,000 ppm.

In certain embodiments, the ceramic particles may include a nano-filler. Optionally, the nano-filler comprises nano-cluster(s). One or more different kinds of nano-cluster(s) can be present. It has been found that compared to other fillers, using nano-cluster(s) can be beneficial because it allows for the formulation of a composition with high filler load resulting in better mechanical properties, e.g. polishability or abrasion and in higher aesthetics. The nano-cluster, if present, can typically be characterized by at least one or all of the following features:

Specific surface area: from 30 to 400 or from 60 to 300 or from 80 to 250 $m^2/g$, comprising particles of $SiO_2$, $ZrO_2$, $Al_2O_3$ and mixtures thereof.

If desired, the specific surface area of the nano-cluster can be determined according to the method of Brunauer, Emmet and Teller (BET), using a measurement device (e.g., MONOSORB, available from Quantachrome Instruments (Boynton Beach, FL)).

Suitable zirconia particles include for instance and without limitation, nano-sized zirconia particles(s) having at least one and up to all of the following parameters or features:

Primary particle size XRD (diameter): from 2 to 100 nm, 2 to 50 nm, 2 to 20 nm, 2 to 15 nm, or 4 to 15 nm;

being essentially spherical, cuboid or a mixture of spherical and cuboid;

being non-associated;

being crystalline;

not being coated with an inorganic coloring agent.

Suitable nano-sized zirconia particles can have at least one and up to all of the following features:

$ZrO_2$ content: from 70 to 100 mol % or 80 to 97 mol %;

$HfO_2$ content: from 0 to 4.5 mol %, 0 to 3 mol %, or 0.1 to 2.8 mol %;

Stabilizer selected from $Y_2O_3$, $CeO_2$, MgO, CaO, $La_2O_3$ or a combination thereof in an amount from 0 to 30 mol %, 1.5 to 16 mol %, 2 to 10 mol %, or 2 to 5 mol %;

$Al_2O_3$ content: from 0 to 1 mol % or from 0.005 to 0.5 mol % or from 0.01 to 0.2 mol %.

According to one embodiment, the nano-sized zirconia particles are characterized as follows: $ZrO_2$ content: from 70 to 98.4 mol %; $HfO_2$ content: from 0.1 to 2.8 mol %; $Y_2O_3$ content: from 1.5 to 28 mol %.

Nano-sized zirconia particles can be obtained or are obtainable by a process comprising the steps of hydrothermal treatment of an aqueous metal salt solution or suspension (e.g. zirconium salt, yttrium salt). Such a process is described in WO 2013/055432 (Kolb et al.).

Suitable silica particles include for instance and without limitation spherical silica particles and non-spherical silica particles. Spherical silica particles in aqueous media (sols) are well known in the art and are available commercially; for example, as silica sols in water or aqueous alcohol solutions under the trade designations LUDOX from W.R. Grace & Co. (Columbia, MD), NYACOL from Nyacol Nanotechnologies Inc. (Ashland, MA), or NALCO from Nalco Company (Naperville, IL). One useful silica sol with a volume average particle size of 5 nm, a pH of 10.5, and a nominal solids content of 15 percent by weight, is available as NALCO 2326 from Nalco Company. Other useful commercially available silica sols include those available as NALCO 1115 and NALCO 1130 from Nalco Company, as REMASOL SP30 from Remet Corp. (Utica, NY), and as LUDOX SM from W.R. Grace & Co. Other suitable silica particles include fumed silica. Agglomerated silica particles are commercially available e.g. from Degussa, Cabot Corp or Wacker under the product designation AEROSIL, CAB-O-SIL and HDK. The specific surface of the hydrophobic fumed silica is typically from 100 to 300 m$^2$/g or from 150 to 250 m$^2$/g. A mixture of different fumed silica can be used, if desired. For example, a mixture of fumed silica the surface of which has been treated with a hydrophobic surface treating agent and fumed silica the surface of which has been treated with a hydrophilic surface treating agent can be used. A suitable nano-silica comprising aggregated nano-sized particles can be produced according to the processes described e.g. in U.S. Pat. No. 6,730,156 (Zhang et al; preparatory example A).

Suitable alumina particles include for instance and without limitation aqueous alumina dispersions (e.g., average particle size of 500 nm alumina particles available from Sumitomo Chemicals (New York, NY)) and alumina particles from Saint-Gobain Surface Conditioning Group (Anaheim, CA).

Suitable yttria particles include for instance and without limitation yttrium oxide available from Treibacher Industrie AG (Althofen, Austria).

Suitable ceria particles include for instance and without limitation colloidal cerium oxide in the form of colloidal sols and nano-structured powders available from NYACOL Nano Technologies, Inc (Ashland, MA). NYACO CDP, for example, has a particle size of 25-30 nm and is a dispersible ceria powder, while NYACOL Ce120/10 is colloidal ceria having a particle size of 100-140 nm and water as a carrier.

Suitable magnesium-magnesia aluminate particles include for instance and without limitation magnesium aluminate spinel in the form of nano-structured powders available from American Elements (Los Angeles, CA). 99.9% Magnesium Aluminate, Spinel Nanopowder, for example, has a nominal particle size of less than 50 nm. Larger particle powders are available from Reade International, Corp (Riverside, RI) as Spinel Powder (MgAl$_2$O$_4$), with a particle size of 1-5 micrometers.

Suitable magnesium oxide particles include for instance and without limitation particles in the form of a water dispersion. It should be understood, however, that a certain amount of magnesium oxide converts to magnesium hydroxide in the presence of water. Preferred magnesium oxide dispersions are made from commercially available magnesium oxide such as ELASTOMAG 170 from Martin Marietta Magnesia Specialties, LLC (Baltimore, MD) and MAGLITE A from Hallstar (Chicago, IL). Magnesium oxides may be dispersed by those skilled in the art or obtained from vendors such as Tiarco Chemical and H. M. Royal.

Suitable apatite particles include for instance and without limitation, hydroxyapatite, fluorapatite and chlorapatite, with high concentrations of OH–, F– and Cl– ions, respectively, in the crystal. For example, suitable hydroxyapatite particles include for instance and without limitation hydroxyapatite from CAM Bioceramics (Leiden, The Netherlands). Hydroxyapatite has been used as a bone substitute because natural bone is approximately 70% hydroxyapatite by weight and 50% hydroxyapatite by volume. Hydroxyapatite has also been used widely for various implant applications such as bioactive space fillers, as scaffolding for the in-growth of tissues, and as a coating for implants to promote bonding with tissue. Syntheses of chlorapatite and fluorapatite have been reported in the literature, such as in Sanjeevi et al., Journal of the European Ceramic Society, 2007, 27, 2287-2294; Montazeri et al., International Journal of Nanomedicine, 2011, 6, 197-201; and Ghomi et al., Materials Research Innovations, 2013, 17:4, 257-262.

Suitable calcite particles include for instance and without limitation calcite nanoparticles commercially available under the trade designations "MULTIFEX MM" and "ALBAFIL" from the Cary Company (Addison, IL); "SOCAL 31" from Solvay Specialty Chemicals, LTD. (Houston, TX); and "NPCC-111" and "NPCC-113" from NanoMaterials Technology LTD (Singapore).

Suitable cordierite particles include for instance and without limitation cordierite particles commercially available from Reade International, Corp (Riverside, RI) as Cordierite powder with an average particle size of 6-7 micrometers, and from American Elements (Los Angeles, CA) as Cordierite or Magnesium Aluminum Silicate.

Suitable silicon nitride particles include for instance and without limitation powders having a mean particle or agglomerate size ($D_{50}$) of 0.5-20 micrometers, such as 1-10 micrometers. The oxygen content of silicon nitride powder is preferably less than 2% by weight and the total carbon content is preferably less than 0.35% by weight. A commercially available silicon nitride powder can be obtained under the trade designation SILZOT from AlzChem Group AG (Trastber, Germany).

Suitable boron carbide particles include for instance and without limitation, B$_4$C powders having a purity of 97% by weight or higher, and a mean particle size ($D_{50}$) of 0.1-8 micrometers. An example of a suitable boron carbide powder is 3M Boron Carbide Powder commercially available from 3M Company (St. Paul, MN).

Suitable titanium diboride particles include for instance and without limitation, TiB$_2$ powders having a mean particle size ($D_{50}$) of about 2-20 micrometers. An example of a suitable titanium diboride powder is 3M Titanium Diboride Powder commercially available from 3M Company.

Suitable zirconium diboride particles include for instance and without limitation, high purity or ultra-high purity ZrB$_2$ powders available from American Elements (Los Angeles, CA).

Suitable boron nitride particles include for instance and without limitation, agglomerates of platelet-shaped, hexagonal boron nitride primary particles, wherein the hexagonal boron nitride primary particles are connected to one another by means of an inorganic binding phase. The inorganic binding phase comprises at least one nitride and/or oxynitride. The nitrides or oxynitrides are preferably compounds of the elements aluminum, silicon, titanium and boron. An example of a suitable boron nitride powder is 3M Boron Nitride Cooling Fillers Platelets commercially available from 3M Company.

Suitable titanium carbide particles include for instance and without limitation, TiC powders having a mean particle size ($D_{50}$) of 1 to 3 micrometers. An example of a suitable titanium carbide powder is TiC Grade High Vacuum 120 commercially available from HC-Starck (Munich, Germany).

Suitable zirconium carbide particles include for instance and without limitation, ZrC powders having a mean particle size ($D_{50}$) of 3 to 5 micrometers. An example of a suitable zirconium carbide powder is ZrC Grade B commercially available from HC-Starck.

Suitable aluminum nitride particles include for instance and without limitation, AN powders having a mean particle size ($D_{50}$) of 0.8 to 2 micrometers. An example of a suitable aluminum nitride powder is AN Grade C commercially available from HC-Starck.

Suitable calcium hexaboride particles include for instance and without limitation, $CaB_6$ powders commercially available from 3M Company as 3M Calcium Hexaboride.

MAX phase particles are layered hexagonal carbides and nitrides having the general formula of $M_{n+1}AX_n$, wherein n=1 to 3, M is an early transition metal, A is an A-group element, and X is independently selected from carbon and nitrogen. The A-group elements are preferably elements 13-16. An example of a suitable MAX phase powder is MAXTHAL 312 powder commercially available from Kanthal (Hallstahammar, Sweden).

In some embodiments, the photopolymerizable slurry or sol comprises 20 wt. % or greater ceramic particles, based on the total weight of the photopolymerizable slurry or sol, 21 wt. % or greater, 22 wt. %, 23 wt. %, 24 wt. %, 25 wt. %, 26 wt. %, 27 wt. %, 28 wt. %, 29 wt. %, 30 wt. %, 32 wt. % or 35 wt. % or greater; and 60 wt. % or less, 29.5 wt. % or less, 28.5 wt. % or less, 27.5 wt. % or less, 26.5 wt. % or less, 25.5 wt. % or less, or 24.5 wt. % or less ceramic particles, based on the total weight of the photopolymerizable slurry or sol. Stated another way, the photopolymerizable slurry or sol can include between 20 percent by weight and 60 percent by weight of ceramic particles, based on the total weight of the photopolymerizable slurry or sol.

In some embodiments, the photopolymerizable slurry or sol comprises 3 volume percent (vol. %) or greater ceramic particles, based on the total volume of the photopolymerizable slurry or sol, 4 vol. %, 5 vol. %, 6 vol. %, 7 vol. %, 8 vol. %, 9 vol. %, 10 vol. %, 11 vol. %, 12 vol. %, 13 vol. %, 14 vol. %, 15 vol. %, 17 vol. %, 19 vol. %, 21 vol. %, 23 vol. %, 25 vol. % or 29 vol. % or greater; and 45 vol. % or less, 44 vol. %, 42 vol. %, 40 vol. %, 38 vol. %, 36 vol. %, 34 vol. %, 32 vol. %, or 30 vol. % or less ceramic particles, based on the total volume of the photopolymerizable slurry or sol. Stated another way, the photopolymerizable slurry or sol can include for instance, between 3 percent by volume and 45 percent by volume of ceramic particles, 5 vol. % to 45 vol. %, or 10 vol. % to 45 vol. % ceramic particles, based on the total volume of the photopolymerizable slurry or sol.

The ceramic particles typically comprise an average (mean) particle size diameter (i.e., $D_{50}$) of 1 nanometer (nm) or greater, 3 nm, 4 nm, 5 nm, 6 nm, 7 nm, 8 nm, 9 nm, 10 nm, 12 nm, 15 nm, 17 nm, 20 nm, 25 nm, 30 nm, 40 nm, 50 nm, 60 nm, 75 nm, 90 nm, 100 nm, 125 nm, 150 nm, 175 nm, 200 nm, 225 nm, 250 nm, 350 nm, 500 nm, 750 nm, 1 micrometer, 1.25 micrometers, 1.5 micrometers, 1.75 micrometers, 2 micrometers, 2.5 micrometers, 3.0 micrometers, 3.5 micrometers, 4.0 micrometers, or 4.5 micrometers or greater; and a $D_{50}$ of 10 micrometers or less, 9.5 micrometers, 9 micrometers, 8.5 micrometers, 8 micrometers, 7.5 micrometers, 7 micrometers, 6.5 micrometers, 6 micrometers, 5.5 micrometers, 5 micrometers, 4.5 micrometers, 3 micrometers, 2 micrometers, 1.5 micrometers, 1 micrometer, 900 nm, 800 nm, 700 nm, 600 nm, 500 nm, 400 nm, 300 nm, or 250 nm or less. Stated another way, the ceramic particles may have an average particle size diameter ($D_{50}$) of 1 nm to 900 nm, 1 nm to 500 nm, 1 nm to 250 nm, 250 nm to 10 micrometers, 1 micrometer to 10 micrometers, 500 nanometers to 1.5 micrometers, or of 250 nm to 1 micrometer. The average (mean) particle size ($D_{50}$) refers to that particle diameter at which 50 percent by volume of the particles in a distribution of particles have that diameter or a smaller diameter, as measured by laser diffraction. Preferably, the average particle size is of the primary particles.

Sintering Aid

The photopolymerizable compositions of the present disclosure optionally include at least one sintering aid. Often, sintering aids assist by removing oxygen during the sintering process. Also, a sintering aid may provide a phase that melts from a solid to a liquid at a lower temperature than the ceramic material, or may provide some alternate mechanism that improves transport of ceramic ions and thus increases densification as compared to a composition not containing the sintering aid.

Suitable sintering aids are not particularly limited, and may include rare earth oxides, alkaline earth oxides, alkali oxides, and combinations thereof. Materials that yield liquids at the sintering temperature of the ceramic particles can be useful.

Rare earth oxides include cerium oxide (e.g., $CeO_2$), dysprosium oxide (e.g., $Dy_2O_3$), erbium oxide (e.g., $Er_2O_3$), europium oxide (e.g., $Eu_2O_3$), gadolinium oxide (e.g., $Gd_2O_3$), holmium oxide (e.g., $Ho_2O_3$), lanthanum oxide (e.g., $La_2O_3$), lanthanum aluminum oxide ($LaAlO_3$), lutetium oxide (e.g., $Lu_2O_3$), neodymium oxide (e.g., $Nd_2O_3$), praseodymium oxide (e.g., $Pr_6O_{11}$), samarium oxide (e.g., $Sm_2O_3$), terbium oxide (e.g., $Tb_2O_3$), thorium oxide (e.g., $Th_4O_7$), thulium oxide (e.g., $Tm_2O_3$), ytterbium oxide (e.g., $Yb_2O_3$), and yttrium oxide (e.g., $Y_2O_3$), and combinations thereof.

Alkaline earth oxides include barium oxide (BaO), calcium oxide (CaO), strontium oxide (SrO), magnesium oxide (MgO), and beryllium oxide (BeO), and combinations thereof.

Alkali oxides include lithium oxide ($Li_2O_2$), sodium oxide ($Na_2O_2$), potassium oxide ($K_2O$), rubidium oxide ($Rb_2O$), and cesium oxide ($Cs_2O$), and combinations thereof.

In some embodiments, a mixture of an alkaline earth oxide and a rare earth oxide is preferable, such as a combination of aluminum oxide and yttrium oxide.

Additional suitable sintering aids include for instance and without limitation, boron, carbon, magnesium, aluminum, silicon, titanium, vanadium, chromium, iron, nickel, copper, aluminum nitride, alumina, yttria, ethyl silicate, sodium silicate with $Mg(NO_3)_2$, other glasses, $Fe_2O_3$, $MgF_2$, and combinations thereof.

In some embodiments, suitable sintering aids comprise aluminum oxide, yttrium oxide, zirconium oxide, silicon oxide, titanium oxide, magnesium oxide, calcium oxide, strontium oxide, barium oxide, lithium oxide, sodium oxide, potassium oxide, carbon, boron, boron carbide, aluminum, aluminum nitride, or combinations thereof. For instance, suitable commercially available sintering aids include Calcined Alumina from Almatis (Ludwigshafen, Germany) and Yttrium Oxide from Treibacher Industrie AG (Althofen, Austria).

Coloring Agents

Photopolymerizable compositions according to embodiments of the present disclosure may further comprise one or more inorganic coloring agent(s). The nature and structure of the inorganic coloring agent(s) is not particularly limited, unless the desired result cannot be achieved. In preferred embodiments, the metal ion is not a free salt, but rather is incorporated into the ceramic particles. Up to 30 mole %, up to 25 mole %, up to 20 mole %, up to 10 mole %, up to 5 mole %, up to 2 mole %, or up to 1 mole % of the ceramic particles can be $Y_2O_3$, $La_2O_3$, $Al_2O_3$, $CeO_2$, $Pr_2O_3$, $Nd_2O_3$, $Pm_2O_3$, $Sm_2O_3$, $Eu_2O_3$, $Gd_2O_3$, $Tb_2O_3$, $Dy_2O_3$, $Ho_2O_3$, $Er_2O_3$, $Tm_2O_3$, $Yb_2O_3$, $Fe_2O_3$, $MnO_2$, $Co_2O_3$, $Cr_2O_3$, NiO, CuO, $V_2O_3$, $Bi_2O_3$, $Ga_2O_3$, $Lu_2O_3$, $HfO_2$, or mixtures thereof. Inorganic oxides such as $Fe_2O_3$, $MnO_2$, $Co_2O_3$, $Cr_2O_3$, NiO, CuO, $Ga_2O_3$, $Er_2O_3$, $Pr_2O_3$, $Eu_2O_3$, $Dy_2O_3$, $Sm_2O_3$, $V_2O_3$, or $W_2O_3$ may be added, for example, to alter the color of the ceramic article to be produced.

If the slurry or sol is to be used for producing dental or orthodontic articles, the following inorganic coloring agent(s) were found to be useful: salts of Mn, Fe, Cu, Pr, Nd, Sm, Eu, Tb, Dy, Er, Bi and mixtures thereof, preferably Er, Tb, Mn, Bi, Nd or Fe, Pr, Co, Cr or V, Cu, Eu, Sm, Dy, with Er, Tb, Mn, Bi, Nd being sometimes particularly preferred. Including a coloring agent may be particularly desirable when the ceramic particles comprise zirconia.

If present, the inorganic coloring agent(s) is present in an amount, based on the moles of the coloring ion being present in the coloring agent and with respect to the total moles of inorganic oxide in the ceramic particles, of 0.001 mole % or greater, 0.005 mole %, or 0.01 mole % or greater; and 0.02 mole % or less, 0.05 mole %, or 0.5 mole % or less.

Solvent

In many embodiments, the photopolymerizable slurry or sol according to the present disclosure further comprises at least one (e.g., organic or aqueous) solvent. Suitable solvents are typically selected to be miscible with water. Further, these solvents are often selected to be soluble in supercritical carbon dioxide or liquid carbon dioxide. The molecular weight of the solvent is usually at least 25 grams/mole (g/mol), 30 g/mol, 40 g/mol, 45 g/mol, 50 g/mol, 75 g/mol, or at least 100 g/mol. The molecular weight can be up to 300 g/mol, 250 g/mol, 225 g/mol, 200 g/mol, 175 g/mol, or up to 150 g/mol. The molecular weight is often in a range of 25 to 300 g/mol, 40 to 300 g/mol, 50 to 200 g/mol, or 75 to 175 g/mol. It is particularly preferable that the one or more solvents have a boiling point above a temperature employed during the additive manufacturing process to minimize solvent evaporation from the sol, slurry, or gelled article. For instance, at least one solvent may be used having a boiling point of 150° C. or greater, 160° C., 170° C., 180° C., or 190° C. or greater.

In certain embodiments, the amount of one or more solvents in a photopolymerizable slurry or sol is 10 wt. % or more, 15 wt. %, 20 wt. %, 25 wt. %, 30 wt. %, 35 wt. %, 40 wt. %, or 45 wt. % or more, based on the total weight of the photopolymerizable slurry or sol; and 70 wt. % or less, 65 wt. %, 60 wt. %, 55 wt. %, or 50 wt. % or less, based on the total weight of the photopolymerizable slurry or sol. Stated another way, the photopolymerizable slurry or sol may contain 10 to 70 wt. % solvent, or 20 to 50 wt. % solvent, based on the total weight of the photopolymerizable slurry or sol. Advantageously, in certain embodiments, the presence of solvent can assist in maintaining a pore structure in an article for removing organic material from the article.

Suitable solvents include for instance and without limitation, diethylene glycol monoethyl ether, ethanol, 1-methoxy-2-propanol (i.e., methoxy propanol), isopropanol, ethylene glycol, N,N-dimethylacetamide, N-methyl pyrrolidone, water, and combinations thereof. A suitable solvent is often a glycol or polyglycol, mono-ether glycol or mono-ether polyglycol, di-ether glycol or di-ether polyglycol, ether ester glycol or ether ester polyglycol, carbonate, amide, or sulfoxide (e.g., dimethyl sulfoxide). The solvent usually has one or more polar groups. The solvent does not have a polymerizable group; that is, the (e.g., organic) solvent is free of a group that can undergo free radical polymerization. Further, no component of the solvent medium has a polymerizable group that can undergo free radical polymerization.

In some embodiments, the solvent contains less than 15 weight percent water, less than 10 percent water, less than 5 percent water, less than 3 percent water, less than 2 percent water, less than 1 weight percent, or even less than 0.5 weight percent water.

Suitable glycols or polyglycols, mono-ether glycols or mono-ether polyglycols, di-ether glycols or di-ether polyglycols, and ether ester glycols or ether ester polyglycols are often of Formula (I).

$$R^1O-(R^2O)_n-R^1 \quad (I)$$

In Formula (I), each $R^1$ independently is hydrogen, alkyl, aryl, or acyl. Suitable alkyl groups often have 1 to 10 carbon atoms, 1 to 6 carbon atoms, or 1 to 4 carbon atoms. Suitable aryl groups often have 6 to 10 carbon atoms and are often phenyl or phenyl substituted with an alkyl group having 1 to 4 carbon atoms. Suitable acyl groups are often of formula $-(CO)R^3$ where $R^3$ is an alkyl having 1 to 10 carbon atoms, 1 to 6 carbon atoms, 1 to 4 carbon atoms, 2 carbon atoms, or 1 carbon atom. The acyl is often an acetate group ($-(CO)CH_3$). In Formula (I), each $R^2$ is typically ethylene or propylene. The variable n is at least 1 and can be in a range of 1 to 10, 1 to 6, 1 to 4, or 1 to 3.

Glycols or polyglycols of Formula (I) have two $R^1$ groups equal to hydrogen. Examples of glycols include, but are not limited to, ethylene glycol, propylene glycol, diethylene glycol, dipropylene glycol, triethylene glycol, and tripropylene glycol.

Mono-ether glycols or mono-ether polyglycols of Formula (I) have a first R' group equal to hydrogen and a second $R^1$ group equal to alkyl or aryl. Examples of mono-ether glycols or mono-ether polyglycols include, but are not limited to, ethylene glycol monohexyl ether, ethylene glycol monophenyl ether, propylene glycol monobutyl ether, diethylene glycol monomethyl ether, diethylene glycol monoethyl ether, diethylene glycol monopropyl ether, diethylene glycol monobutyl ether, diethylene glycol monohexyl ether, dipropylene glycol monomethyl ether, dipropylene glycol monoethyl ether, dipropylene glycol monopropyl ether, triethylene glycol monomethyl ether, triethylene glycol monoethyl ether, triethylene glycol monobutyl ether, tripropylene glycol monomethyl ether, and tripropylene glycol monobutyl ether.

Di-ether glycols or di-ether polyglycols of Formula (I) have two $R^1$ groups equal to alkyl or aryl. Examples of di-ether glycols or di-ether polyglycols include, but are not limited to, ethylene glycol dipropyl ether, ethylene glycol dibutyl ether, dipropylene glycol dibutyl ether, diethylene glycol dimethyl ether, diethylene glycol diethyl ether, triethylene glycol dimethyl ether, tetraethylene glycol dimethyl ether, and pentaethylene glycol dimethyl ether.

Ether ester glycols or ether ester polyglycols of Formula (I) have a first $R^1$ group equal to an alkyl or aryl and a second $R^1$ group equal to an acyl. Examples of ether ester glycols or ether ester polyglycols include, but are not limited to, ethylene glycol butyl ether acetate, diethylene glycol butyl ether acetate, and diethylene glycol ethyl ether acetate.

Other suitable solvents are carbonates of Formula (II).

In Formula (II), $R^4$ is hydrogen or an alkyl such as an alkyl having 1 to 4 carbon atoms, 1 to 3 carbon atoms, or 1 carbon atom. Examples include ethylene carbonate and propylene carbonate.

Yet other suitable solvents are amides of Formula (III).

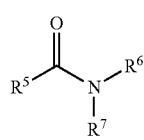

(III)

In Formula (III), group $R^5$ is hydrogen, alkyl, or combines with $R^6$ to form a five-membered ring including the carbonyl attached to $R^5$ and the nitrogen atom attached to $R^6$. Group $R^6$ is hydrogen, alkyl, or combines with $R^5$ to form a five-membered ring including the carbonyl attached to $R^5$ and the nitrogen atom attached to $R^6$. Group $R^7$ is hydrogen or alkyl. Suitable alkyl groups for $R^5$, $R^6$, and $R^7$ have 1 to 6 carbon atoms, 1 to 4 carbon atoms, 1 to 3 carbon atoms, or 1 carbon atom. Examples of amide organic solvents of Formula (III) include, but are not limited to, formamide, N,N-dimethylformamide, N,N-dimethylacetamide, N,N-diethylacetamide, N-methyl-2-pyrrolidone, and N-ethyl-2-pyrrolidone.

Additionally, in certain embodiments, the photopolymerizable slurry or sol further comprises a dispersant to assist in distributing the ceramic particles in the photopolymerizable slurry or sol. Typically, one or more dispersants can be present in a photopolymerizable slurry or sol in an amount of 0.5 wt. % or greater, based on the total weight of the photopolymerizable slurry or sol, 0.55 wt. % or greater, 0.60 wt. %, 0.65 wt. %, or 0.70 wt. % or greater; and 5.0 wt. % or less, 4.0 wt. %, 3.0 wt. %, 2.0 wt. %, 1.0 wt. %, 0.95 wt. %, 0.90 wt. %, 0.85 wt. %, 0.80 wt. %, or 0.75 wt. % or less, based on the total weight of the photopolymerizable slurry or sol. Stated another way, the optional dispersant may be present in an amount of 0.5 wt. % to 5.0 wt. %, based on the total weight of the photopolymerizable slurry or sol. Suitable dispersants include for instance and without limitation, dispersants available under the trade designations SOLPLUS or SOLSPERSE from Lubrizol (Wickliffe, OH), such as SOLPLUS D510, R700, R720, D540, D545, and D570, SOLSPERSE 20000, S71000, M387, M389, S41000, and S79000, and combinations thereof.

Radiation Curable Monomer

The photopolymerizable slurry or sol described in the present text comprises one or more radiation curable monomers being part of or forming an organic matrix.

The radiation curable monomer(s) being present in the photopolymerizable slurry or sol can be described as first, second, third, etc., monomer. The nature and structure of the radiation curable monomer(s) is not particularly limited unless the desired result cannot be achieved. In some embodiments, the at least one radiation curable monomer comprises an acrylate. Preferably, the at least one radiation curable monomer includes a (meth)acrylate, an epoxy, a silane, or combinations thereof.

In some embodiments, upon polymerization, the radiation curable monomers form a network with the (preferably) homogeneously dispersed ceramic particles.

According to one embodiment, the photopolymerizable slurry or sol contains as a first monomer a polymerizable surface modification agent. Optionally, at least a portion of the ceramic particles in the photopolymerizable slurry or sol may comprise a surface modifier attached to a surface of the ceramic particles. A surface modifier may help to improve compatibility of the particles contained in the slurry or sol with an organic matrix material also present in the slurry or sol. Surface modifiers may be represented by the formula A-B, where the A group is capable of attaching to the surface of a ceramic particle and the B group is radiation curable.

Group A can be attached to the surface of the ceramic particle by adsorption, formation of an ionic bond, formation of a covalent bond, or a combination thereof. Examples of suitable Group A moieties include acidic moieties (like carboxylic acid groups, phosphoric acid groups, sulfonic acid groups and anions thereof) and silanes. Group B comprises a radiation curable moiety. Examples of suitable Group B moieties include vinyl, in particular acryl or methacryl moieties.

Suitable surface modifiers comprise polymerizable carboxylic acids and/or anions thereof, polymerizable sulfonic acids and/or anions thereof, polymerizable phosphoric acids and/or anions thereof, and polymerizable silanes. Suitable surface modification agents are further described, for example, in WO 2009/085926 (Kolb et al.), the disclosure of which is incorporated herein by reference.

An example of a radically polymerizable surface modifier is a polymerizable surface modification agent comprising an acidic moiety or anion thereof, e.g. a carboxylic acid group. Exemplary acidic radically polymerizable surface modifiers include acrylic acid, methacrylic acid, beta-carboxyethyl acrylate, and mono-2-(methacryloxyethyl)succinate.

Exemplary radically polymerizable surface modifiers can be reaction products of hydroxyl-containing polymerizable monomers with cyclic anhydrides such as succinic anhydride, maleic anhydride and phthalic anhydride. Exemplary polymerizable hydroxyl-containing monomers include hydroxyethyl acrylate, hydroxyethyl methacrylate, hydroxypropyl acrylate, hydroxypropyl methacrylate, hydroxybutyl acrylate, and hydroxybutyl methacrylate. Acryloxy and methacryloxy functional polyethylene oxide and polypropylene oxide may also be used as the polymerizable hydroxyl-containing monomers.

An exemplary radically polymerizable surface modifier for imparting both polar character and reactivity to the ceramic nanoparticles is mono(methacryloxypolyethyleneglycol) succinate.

Another example of a radically polymerizable surface modifier is a polymerizable silane. Exemplary polymerizable silanes include methacryloxyalkyltrialkoxysilanes or acryloxy-alkyltrialkoxysilanes (e.g., 3-methacryloxypropyltrimethoxysilane, 3-acryloxypropyltrimethoxy-silane, and 3-(methacryloxy)propyltriethoxysilane); methacryloxyalkyldialkoxysilanes or acryloxyalkylalkyldialkoxysilanes (e.g., 3-(methacryloxy)propylmethyldimethoxysilane and 3-(acryloxypropyl)methyldimethoxysilane); methacryloxyalkyldialkylalkoxysilanes or acyrloxyalkyldialkylalkoxysilanes (e.g., 3-(methacryloxy)propyldimethylethoxysilane); mercapto-alkyltrialkoxylsilanes (e.g., 3-mercaptopropyltrimethoxysilane); aryltrialkoxysilanes (e.g., styrylethyltrimethoxysilane); vinylsilanes (e.g., vinylmethyldiacetoxysilane, vinyldimethylethoxy-silane, vinylmethyldiethoxysilane, vinyltrimethoxysilane, vinyltriethoxysilane, vinyltriacetoxysilane, vinyltriisopropoxysilane, and vinyltris(2-methoxyethoxy)silane).

A surface modifier can be added to the ceramic particles using conventional techniques. The organic matrix can be added before or after surface modification or simultaneously with surface modification. Various methods of adding the surface modification agent are further described, for example, in WO 2009/085926 (Kolb et al.), the disclosure of which is incorporated herein by reference.

The surface modification reactions can occur at room temperature (e.g., 20° C. to 25° C.) or at an elevated temperature (e.g., up to 95° C.). When the surface modifiers are acids such as carboxylic acids, the ceramic particles typically can be surface-modified at room temperature. When the surface modification agents are silanes, the ceramic particles are typically surface modified at elevated temperatures.

The optional first monomer can function as a polymerizable surface modification agent. Multiple first monomers can be used. The first monomer can be the only kind of surface modifier or can be combined with one or more other non-polymerizable surface modifiers. In some embodiments, the amount of the first monomer is at least 20 wt. % based on a total weight of polymerizable material (radiation curable monomers). For example, if present, the amount of the first monomer is often at least 25 wt. %, at least 30 wt. %, at least 35 wt. %, or at least 40 wt. %. The amount of the first monomer can be up to 100 wt. %, up to 90 wt. %, up to 80 wt. %, up to 70 wt. %, up to 60 wt. %, or up to 50 wt. %. Some photopolymerizable slurries or sols contain 20 to 100 wt. %, 20 to 80 wt. %, 20 to 60 wt. %, 20 to 50 wt. %, or 30 to 50 wt. % of the first monomer based on a total weight of polymerizable material.

The optional first monomer (i.e., the polymerizable surface modification agent) can be the only monomer in the polymerizable material or it can be combined with one or more second monomers, as described in further detail below.

According to one embodiment, the photopolymerizable slurry or sol comprises one or more second monomers comprising at least one or two radiation curable moieties. In particular, the second monomers comprising at least two radiation curable moieties may act as crosslinker(s) during the gel-forming step. Any suitable second monomer that does not have a surface modification group can be used. The second monomer does not have a group being capable of attaching to the surface of a ceramic particle. That is, the optional second monomer does not have a carboxylic acid group or a silyl group. The second monomers are often polar monomers (e.g., non-acidic polar monomers), monomers having a plurality of polymerizable groups, alkyl (meth) acrylates and mixtures thereof.

A successful build typically requires a certain level of gel strength as well as shape resolution, and adding a second monomer comprising at least two radiation curable moieties to the photopolymerizable slurry or sol described herein may facilitate the optimization both properties. A crosslinked approach often allows for greater gel strength to be realized at a lower energy dose since the polymerization creates a stronger network. In some examples, higher energy doses have been applied to increase layer adhesion of non-crosslinked systems. While an article is successfully built, the higher energy often impacts the resolution of the final article, causing overbuild to potentially occur, especially in the case of highly translucent materials where the light, and with it the cure depth, can penetrate further into the material. The presence of a monomer having a plurality of polymerizable groups tends to enhance the strength of the gel composition formed when the photopolymerizable slurry or sol is polymerized. The amount of the monomer with a plurality of polymerizable groups can be used to adjust the flexibility and the strength of the gelled body, and indirectly optimize the gelled body resolution and final article resolution. Such gel compositions can be easier to process without cracking, and in the case of transforming the gel into a fully dense ceramic, increased gel strength aids in the robustness of the post-building procedures.

In many embodiments, the second monomer includes a monomer having a plurality of polymerizable groups. The number of polymerizable groups can be in a range of 2 to 6 or even higher. In many embodiments, the number of polymerizable groups is in a range of 2 to 5 or 2 to 4. The polymerizable groups are typically (meth)acryloyl groups.

Exemplary monomers with two (meth)acryloyl groups include 1,2-ethanediol diacrylate, 1,3-propanediol diacrylate, 1,9-nonanediol diacrylate, 1,12-dodecanediol diacrylate, 1,4-butanediol diacrylate, 1,6-hexanediol diacrylate, butylene glycol diacrylate, bisphenol A diacrylate, diethylene glycol diacrylate, triethylene glycol diacrylate, tetraethylene glycol diacrylate, tripropylene glycol diacrylate, polyethylene glycol diacrylate, polypropylene glycol diacrylate, polyethylene/polypropylene copolymer diacrylate, polybutadiene di(meth)acrylate, propoxylated glycerin tri(meth) acrylate, and neopentylglycol hydroxypivalate diacrylate modified caprolactone.

Exemplary monomers with three or four (meth)acryloyl groups include, but are not limited to, trimethylolpropane triacrylate (e.g., commercially available under the trade designation TMPTA-N from Cytec Industries, Inc. (Smyrna, GA, USA) and under the trade designation SR-351 from Sartomer (Exton, PA, USA)), pentaerythritol triacrylate (e.g., commercially available under the trade designation SR-444 from Sartomer), ethoxylated (3) trimethylolpropane triacrylate (e.g., commercially available under the trade designation SR-454 from Sartomer), ethoxylated (4) pentaerythritol tetraacrylate (e.g., commercially available under the trade designation SR-494 from Sartomer), tris(2-hydroxyethylisocyanurate) triacrylate (e.g., commercially available under the trade designation SR-368 from Sartomer), a mixture of pentaerythritol triacrylate and pentaerythritol tetraacrylate (e.g., commercially available from Cytec Industries, Inc., under the trade designation PETIA with an approximately 1:1 ratio of tetraacrylate to triacrylate and under the trade designation PETA-K with an approximately 3:1 ratio of tetraacrylate to triacrylate), pentaerythritol tetraacrylate (e.g., commercially available under the trade designation SR-295 from Sartomer), and di-trimethylolpropane tetraacrylate (e.g., commercially available under the trade designation SR-355 from Sartomer).

Exemplary monomers with five or six (meth)acryloyl groups include, but are not limited to, dipentaerythritol pentaacrylate (e.g., commercially available under the trade designation SR-399 from Sartomer) and a hexa-functional urethane acrylate (e.g., commercially available under the trade designation CN975 from Sartomer).

In some embodiments, the radiation curable monomer comprises an epoxy. Epoxy compounds which are suitable for use as photopolymerizable slurries or sols include, for instance and without limitation, cycloaliphatic oxiranes, aliphatic oxiranes, aromatic oxiranes, or a combination thereof. These compounds, which are widely known as epoxy compounds, can be monomeric, polymeric, or mixtures thereof. These materials generally have, on the average, at least one polymerizable epoxy group (oxirane unit) per molecule, and preferably at least about 1.5 polymerizable epoxy groups per molecule. The polymeric epoxides include linear polymers having terminal epoxy groups (e.g., a diglycidyl ether of a polyoxyalkylene glycol), polymers having skeletal oxirane units (e.g., polybutadiene polyepoxide), and polymers having pendent epoxy groups (e.g., a glycidyl methacrylate polymer or copolymer). The epoxides may be pure compounds or may be mixtures containing one, two, or more epoxy groups per molecule. The "average" number of epoxy groups per molecule is determined by dividing the total number of epoxy groups in epoxy-containing material by the total number of epoxy molecules present. The epoxy compounds may have a molecular weight of from about 58 to about 100,000 or more.

Suitable epoxy compounds include those which contain cyclohexene oxide groups, such as the epoxycyclohexanecarboxylates, for example, 3,4-epoxycyclohexylmethyl-3, 4-epoxy cyclohexanecarboxylate, 3,4-epoxy-2-methylcyclohexylmethyl-3,4-epoxy-2-methylcyclohexane carboxylate, and bis(3,4-epoxy-6-methylcyclohexylmethyl) adipate. A more detailed list of useful epoxides of this nature is provided in U.S. Pat. No. 3,117,099 (Proops et al.).

Suitable epoxy compounds also include glycidyl ether compounds, such as glycidoxyalkyl and glycidoxyaryl compounds containing 1 to 6 glycidoxy groups. Examples include glycidyl ethers of polyhydric phenols, which can be obtained by reacting the polyhydric phenol with an excess of epichlorohydrin to provide, for example, 2,2-bis(2,3-epoxypropoxyphenyl)propane. Additional epoxides of this type are described in U.S. Pat. No. 3,018,262 (Schroeder), and in "Handbook of Epoxy Resins" by Lee and Neville, McGraw-hill Book Co., New York (1967). Many suitable epoxy compounds are commercially available and are listed in U.S. Pat. No. 6,187,833 (Oxman et al.).

Some photopolymerizable slurry or sol compositions contain 0 to 80 wt. % of a second monomer having a plurality of polymerizable groups based on a total weight of the polymerizable material. For example, the amount can be in a range of 10 to 80 wt. %, 20 to 80 wt. %, 30 to 80 wt. %, 40 to 80 wt. %, 10 to 70 wt. %, 10 to 50 wt. %, 10 to 40 wt. %, or 10 to 30 wt. %.

The overall composition of the polymerizable material is often selected so that the polymerized material is soluble in a solvent medium. Homogeneity of the organic phase is often preferable to avoid phase separation of the organic component in the gel composition. This tends to result in the formation of smaller and more homogeneous pores (pores with a narrower size distribution) in the subsequently formed aerogel or xerogel. Further, the overall composition of the polymerizable material can be selected to adjust compatibility with a solvent medium and to adjust the strength, flexibility, and uniformity of the gel composition. Still further, the overall composition of the polymerizable material can be selected to adjust the burnout characteristics of the organic material prior to sintering.

In some embodiments, the optional second monomer is a polar monomer. As used herein, the term "polar monomer" refers to a monomer having a free radical polymerizable group and a polar group. The polar group is typically non-acidic and often contains a hydroxyl group, a primary amido group, a secondary amido group, a tertiary amido group, an amino group, or an ether group (i.e., a group containing at least one alkylene-oxy-alkylene group of formula —R—O—R— where each R is an alkylene having 1 to 4 carbon atoms).

Suitable optional polar monomers having a hydroxyl group include, but are not limited to, hydroxyalkyl (meth) acrylates (e.g., 2-hydroxyethyl (meth)acrylate, 2-hydroxypropyl (meth)acrylate, 3-hydroxypropyl (meth)acrylate, and 4-hydroxybutyl (meth)acrylate), and hydroxyalkyl (meth) acrylamides (e.g., 2-hydroxyethyl (meth)acrylamide or 3-hydroxypropyl (meth)acrylamide), ethoxylated hydroxyethyl (meth)acrylate (e.g., monomers commercially available from Sartomer under the trade designation CD570, CD571, and CD572), and aryloxy substituted hydroxyalkyl (meth)acrylates (e.g., 2-hydroxy-2-phenoxypropyl (meth) acrylate).

Exemplary polar monomers with a primary amido group include (meth)acrylamide. Exemplary polar monomers with secondary amido groups include, but are not limited to, N-alkyl (meth)acrylamides such as N-methyl (meth)acrylamide, N-ethyl (meth)acrylamide, N-isopropyl (meth)acrylamide, N-tert-octyl (meth)acrylamide, and N-octyl (meth) acrylamide. Exemplary polar monomers with a tertiary amido group include, but are not limited to, N-vinyl caprolactam, N-vinyl-2-pyrrolidone, (meth)acryloyl morpholine, and N,N-dialkyl (meth)acrylamides such as N,N-dimethyl (meth)acrylamide, N,N-diethyl (meth)acrylamide, N,N-dipropyl (meth)acrylamide, and N,N-dibutyl (meth)acrylamide.

Polar monomers with an amino group include various N,N-dialkylaminoalkyl (meth)acrylates and N,N-dialkylaminoalkyl (meth)acrylamides. Examples include, but are not limited to, N,N-dimethyl aminoethyl (meth)acrylate, N,N-dimethylaminoethyl (meth)acrylamide, N,N-dimethylaminopropyl (meth)acrylate, N,N-dimethylaminopropyl (meth)acrylamide, N,N-diethylaminoethyl (meth)acrylate, N,N-diethylaminoethyl (meth)acrylamide, N,N-diethylaminopropyl (meth)acrylate, and N,N-diethylaminopropyl (meth)acrylamide.

Exemplary polar monomers with an ether group include, but are not limited to, alkoxylated alkyl (meth)acrylates such as ethoxyethoxyethyl (meth)acrylate, 2-methoxyethyl (meth)acrylate, and 2-ethoxyethyl (meth)acrylate; and poly (alkylene oxide) (meth)acrylates such as poly(ethylene oxide) (meth)acrylates, and polypropylene oxide) (meth) acrylates. The poly(alkylene oxide) acrylates are often referred to as poly(alkylene glycol) (meth)acrylates. These monomers can have any suitable end group such as a hydroxyl group or an alkoxy group. For example, when the end group is a methoxy group, the monomer can be referred to as methoxy poly(ethylene glycol) (meth)acrylate.

Suitable alkyl (meth)acrylates that can be used as a second monomer can have an alkyl group with a linear, branched, or cyclic structure. Examples of suitable alkyl (meth)acrylates include, but are not limited to, methyl (meth)acrylate, ethyl (meth)acrylate, n-propyl (meth)acrylate, isopropyl (meth)acrylate, n-butyl (meth)acrylate, isobutyl (meth)acrylate, n-pentyl (meth)acrylate, 2-methylbutyl (meth)acrylate, n-hexyl (meth)acrylate, cyclohexyl (meth)acrylate, 4-methyl-2-pentyl (meth)acrylate, 2-ethylhexyl (meth)acrylate, 2-methylhexyl (meth)acrylate, n-octyl (meth)acrylate, isooctyl (meth)acrylate, 2-octyl (meth)acrylate, isononyl (meth)acrylate, isoamyl (meth)acrylate, 3,3, 5-trimethylcyclohexyl (meth)acrylate, n-decyl (meth)acrylate, isodecyl (meth)acrylate, isobornyl (meth)acrylate, 2-propylheptyl (meth)acrylate, isotridecyl (meth)acrylate, isostearyl (meth)acrylate, octadecyl (meth)acrylate, 2-octyldecyl (meth)acrylate, dodecyl (meth)acrylate, lauryl (meth) acrylate, and heptadecanyl (meth)acrylate. In some embodiments, the alkyl (meth)acrylates are a mixture of various isomers having the same number of carbon atoms as described in PCT Patent Application Publication WO 2014/ 151179 (Colby et al.). For example, an isomer mixture of octyl (meth)acrylate can be used.

The amount of a second monomer that is a polar monomer and/or an alkyl (meth)acrylate monomer is often in a range of 0 to 40 wt. %, 0 to 35 wt. %, 0 to 30 wt. %, 5 to 40 wt. %, or 10 to 40 wt. % based on a total weight of the polymerizable material.

The total amount of polymerizable material is often at least 10 wt. %, at least 12 wt. %, at least 15 wt. %, or at least 18 wt. % based on the total weight of the photopolymerizable sol or slurry. The amount of polymerizable material can be up to 50 wt. %, up to 40 wt. %, up to 30 wt. %, or up to 20 wt. %, based on the total weight of the photopolymerizable sol or slurry. For example, the amount of polymerizable material can be in a range of 10-50 wt. %, 15-40 wt. %, 15-30 wt. %, or 10-20 wt. % based on the total weight of the photopolymerizable sol or slurry.

In some embodiments, the polymerizable material contains 20 to 100 wt. % first monomer and 0 to 80 wt. % second monomer based on a total weight of polymerizable material. For example, polymerizable material includes 30 to 100 wt. % first monomer and 0 to 70 wt. % second monomer, 30 to 90 wt. % first monomer and 10 to 70 wt. % second monomer, 30 to 80 wt. % first monomer and 20 to 70 wt. % second monomer, 30 to 70 wt. % first monomer and 30 to 70 wt. % second monomer, 40 to 90 wt. % first monomer and 10 to 60 wt. % second monomer, 40 to 80 wt. % first monomer and 20 to 60 wt. % second monomer, 50 to 90 wt. % first monomer and 10 to 50 wt. % second monomer, or 60 to 90 wt. % first monomer and 10 to 40 wt. % second monomer.

In some embodiments, the polymerizable material contains 0 wt. % first monomer and 100 wt. % second monomer based on a total weight of the polymerizable material.

Photoinitiator

Photopolymerizable slurries or sols described herein typically further comprise one or more photoinitiators. In certain embodiments the photoinitiator(s) can be characterized by being soluble in a solvent contained in the slurry or sol and/or absorbing radiation within a range from 200 to 500 nm or from 300 to 450 nm. The photoinitiator should be able to start or initiate the curing or hardening reaction of the radiation curable component(s) being present in the photopolymerizable slurries or sols.

The following classes of photoinitiator(s) can be used: a) two-component system where a radical is generated through abstraction of a hydrogen atom from a donor compound; b) one component system where two radicals are generated by cleavage; and/or c) a system comprising an iodonium salt, a visible light sensitizer, and an electron donor compound.

Examples of photoinitiators according to type (a) typically contain a moiety selected from benzophenone, xanthone or quinone in combination with an aliphatic amine.

Examples of photoinitiators according to type (b) typically contain a moiety selected form benzoin ether, acetophenone, benzoyl oxime or acyl phosphine. Suitable exemplary photoinitiators are those available under the trade designation OMNIRAD from IGM Resins (Waalwijk, The Netherlands) and include 1-hydroxycyclohexyl phenyl ketone (OMNIRAD 184), 2,2-dimethoxy-1,2-diphenylethan-1-one (OMNIRAD 651), bis(2,4,6 trimethylbenzoyl) phenylphosphineoxide (OMNIRAD 819), 1-[4-(2-hydroxyethoxy)phenyl]-2-hydroxy-2-methyl-1-propane-1-one (OMNIRAD 2959), 2-benzyl-2-dimethylamino-1-(4-morpholinophenyl)butanone (OMNIRAD 369), 2-methyl-1-[4-(methylthio)phenyl]-2-morpholinopropan-1-one (OMNIRAD 907), 2-hydroxy-2-methyl-1-phenyl propan-1-one (OMNIRAD 1173), 2, 4, 6-trimethylbenzoyldiphenylphosphine oxide (OMNIRAD TPO), and 2, 4, 6-trimethylbenzoylphenyl phosphinate (OMNIRAD TPO-L). Additional suitable photoinitiators include for example and without limitation, Oligo[2-hydroxy-2-methyl-1-[4-(1-methylvinyl) phenyl]propanone] ESACURE ONE (Lamberti S.p.A., Gallarate, Italy), 2-hydroxy-2-methylpropiophenone, benzyl dimethyl ketal, 2-methyl-2-hydroxypropiophenone, benzoin methyl ether, benzoin isopropyl ether, anisoin methyl ether, aromatic sulfonyl chlorides, photoactive oximes, and combinations thereof.

Examples of photoinitiators according to type (c) typically contain the following moieties for each component: Suitable iodonium salts are described in U.S. Pat. Nos. 3,729,313, 3,741,769, 3,808,006, 4,250,053 and 4,394,403, the iodonium salt disclosures of which are incorporated herein by reference. The iodonium salt can be a simple salt, containing an anion such as $Cl^-$, $Br^-$, $I^-$ or $C_4H_5SO_3^-$; or a metal complex salt containing an antimonate, arsenate, phosphate or borate such as $SbF_5OH^-$ or $AsF_6^-$. Mixtures of iodonium salts can be used if desired. For instance, suitable iodonium salts include each of diphenyliodonium hexafluorophosphate and diphenyliodonium chloride, both commercially available from Sigma-Aldrich (St. Louis, MO). The visible light sensitizer may be selected from ketones, coumarin dyes (e.g., ketocoumarins), xanthene dyes, acridine dyes, thiazole dyes, thiazine dyes, oxazine dyes, azine dyes, aminoketone dyes, porphyrins, aromatic polycyclic hydrocarbons, p-substituted aminostyryl ketone compounds, aminotriaryl methanes, merocyanines, squarylium dyes and pyridinium dyes. Preferably, the visible light sensitizer is an alpha-diketone; camphorquinone is particularly preferred and commercially available from Sigma-Aldrich. The electron donor compound is typically an alkyl aromatic polyether or an alkyl, aryl amino compound wherein the aryl group is substituted by one or more electron withdrawing groups. Examples of suitable electron withdrawing groups include carboxylic acid, carboxylic acid ester, ketone, aldehyde, sulfonic acid, sulfonate and nitrile groups. The electron donor compound may be selected from polycylic aromatic compounds (such as biphenylenes, naphthalenes, anthracenes, benzanthracenes, pyrenes, azulenes, pentacenes, decacyclenes, and derivatives (e.g., acenaphthenes) and combinations thereof), and N-alkyl carbazole compounds (e.g., N-methyl carbazole). Preferred donor compounds include 4-dimethylaminobenzoic acid, ethyl 4-dimethylaminobenzoate, 3-dimethylaminobenzoic acid, 4-dimethylaminobenzoin, 4-dimethylaminobenzaldehyde, 4-dimethylaminobenzonitrile and 1,2,4-trimethoxybenzene. Photoinitiators according to type (c) are described in detail, for instance, in co-owned U.S. Pat. No. 6,187,833 (Oxman et al.).

A photoinitiator can be present in a photopolymerizable slurry or sol described herein in any amount according to the particular constraints of the additive manufacturing process. In some embodiments, a photoinitiator is present in a photopolymerizable slurry or sol in an amount of 0.005 wt. % or more, 0.01 wt. % or more, 0.05 wt. % or more, 0.1 wt. % or more, or 0.3 wt. % or more; and 5% wt. % or less, 4 wt. % or less, 3 wt. % or less, 2 wt. % or less, 1 wt. % or less, or 0.5 wt. % or less, based on the total weight of the photopolymerizable slurry or sol. In some cases, a photoinitiator is present in an amount of about 0.005-5 wt. %, or 0.1-2 wt. %, based on the total weight of the photopolymerizable slurry or sol.

In addition, a photopolymerizable slurry or sol described herein can further comprise one or more sensitizers to increase the effectiveness of one or more photoinitiators that may also be present. In some embodiments, a sensitizer comprises isopropylthioxanthone (ITX) or 2-chlorothioxanthone (CTX). Other sensitizers may also be used. If used in the photopolymerizable composition, a sensitizer can be present in an amount of about 0.001% by weight or more, 0.01% by weight or more, or about 1% by weight or more, based on the total weight of the photopolymerizable slurry or sol.

Inhibitor

A photopolymerizable slurry or sol described herein optionally also comprises one or more polymerization inhibitors (e.g., photoinhibitors). A polymerization inhibitor is often included in a photopolymerizable slurry or sol to provide additional thermal or photo stability to the composition. An inhibitor may extend the shelf life of the photopolymerizable slurry or sol, help prevent undesired side reactions, and adjust the polymerization process of the radiation curable component(s) present in the slurry or sol. Adding one or more inhibitor(s) to the photopolymerizable slurry or sol may further help to improving the accuracy or detail resolution of the surface of the ceramic article. Specific examples of inhibitor(s) which can be used include: p-methoxyphenol (MOP), hydroquinone monomethylether (MEHQ), 2,6-di-tert-butyl-4-methyl-phenol (BHT; Ionol), phenothiazine, 2,2,6,6-tetramethyl-piperidine-1-oxyl radical (TEMPO) and mixtures thereof.

In some embodiments, a polymerization inhibitor, if used, is present in an amount of about 0.001-5 wt. %, 0.001-1 wt. %, or 0.01-1 wt. %, based on the total weight of the photopolymerizable slurry or sol.

A photopolymerizable slurry or sol as described herein can also comprise one or more absorption modifiers (e.g., dyes, optical brighteners, pigments, etc.) to control the penetration depth of actinic radiation. One suitable optical brightener is Tinopal OB, a benzoxazole, thiophenediyl)bis[5-(1,1-dimethylethyl)], available from BASF Corporation (Florham Park, NJ). The absorption modifier, if used, can be present in an amount of about 0.001-5 wt. %, about 0.01-1 wt. %, about 0.1-3 wt. %, or about 0.1-1 wt. %, based on the total weight of the photopolymerizable slurry or sol.

Slurries and Sols

The preparation of photopolymerizable slurries or sols is typically conducted under light-restricted conditions to avoid an undesired early polymerization. In some embodiments, the photopolymerizable slurry or sol is prepared by speed mixing the components to form a preferably homogenous slurry or sol. The slurry or sol is typically stored in a suitable device like a vessel, a bottle, cartridge or container before use.

A photopolymerizable slurry or sol (e.g., uncured) has a viscosity profile consistent with the requirements and parameters of one or more additive manufacturing devices (e.g., 3D printing systems). In certain embodiments, the photopolymerizable slurry or sol exhibits a dynamic viscosity at 23 degrees Celsius of 500 milliPascals seconds (mPa·s) or less, 400 mPa·s, 300 mPa·s, 200 mPa·s, 100 mPa·s, 50 mPa·s, or 25 mPa·s or less. In some instances, a photopolymerizable slurry or sol described herein when uncured exhibits a dynamic viscosity of 1 to 500 mPa·s, 1 to 100 mPa·s, or 1 to 50 mPa·s using a Brookfield DV-E Viscometer (Brookfield Engineering Laboratories, Middleboro, MA) using disc and cylinder spindles at 23 degrees Celsius and at shear rates of 2 Vs to 20 Vs. In some cases, a photopolymerizable composition described herein when uncured exhibits a dynamic viscosity of less than about 50 mPa·s.

The photopolymerizable slurry or sol containing ceramic particles is solidified by curing (e.g., gelation). Preferably, the gelation process allows gels to be formed of any shape without cracks and provide gelled bodies that can be further processed without inducing cracks. For example, preferably, the gelation process leads to a gelled body having a structure that will not collapse when the solvent is removed; so-called "free-standing gel". It is preferable that the gel contain the minimum amount of organic material or polymer modifiers. After processing the photopolymerizable slurry or sol to form a gel, the gelled article is typically removed from the device used for conducting the additive manufacturing process. If desired, the surface of the gelled article is cleaned, e.g., by rinsing with a solvent, soaking in a solvent, and/or subjecting the gelled article to mass inertial force. Suitable solvents preferably include mixtures thereof or the same solvent(s) described above in the present text.

As noted above, an aerogel is a porous material derived from a gel, in which the liquid component of the gel has been replaced with a gas. The solvent removal (e.g., extraction) is often done under supercritical conditions. There is no capillary effect for this type of drying, and the linear shrinkage is often in a range of 0 to 25%, 0 to 20%, 0 to 15%, 5 to 15%, or 0 to 10%. The density typically remains uniform throughout the structure. In contrast, a xerogel is a three-dimensional solid derived from a gel, in which the liquid component of the gel has been removed (e.g., extracted) by evaporation under ambient conditions or at an elevated temperature.

In some embodiments, the gelled body structure is compatible with and stable in a variety of solvents and conditions that may be necessary for supercritical extraction. Furthermore, the gel structure should be compatible with supercritical extraction fluids (e.g., supercritical carbon dioxide). In other words, the gels should be stable and strong enough to withstand drying, so as to produce stable aerogels and/or xerogels and give materials that can be heated to burn out the organics, pre-sintered, and densified without inducing cracks. Preferably, the resulting aerogels and/or xerogels have relatively small and uniform pore sizes to aid in sintering them to high density at low sintering temperatures. However, preferably the pores are large enough to allow product gases of organic burnout to escape without leading to cracking of the aerogel or xerogel. It is believed that the rapid nature of the gelation step results in an essentially homogeneous distribution of the ceramic particles throughout the gel, which can aid in the subsequent processing steps such as supercritical extraction, organic burnout, and sintering.

If applied, the supercritical drying step can be characterized by at least one, more or all of the following features:
a) Temperature: 20° C. to 100° C., 30° C. to 80° C., or 15° C. to 150° C.;
b) Pressure: 5 to 200 MPa, 10 to 100 MPa, 1 to 20 MPa, or 5 to 15 MPa;
c) Duration: 2 to 175 hours, 5 to 25 hours, or 1 to 5 hours; and
d) Extraction or drying medium: carbon dioxide in its supercritical stage.

A combination of features (a), (b), (c), and (d) is sometimes preferred.

Supercritical extraction can remove all or most of the (e.g., organic) solvent in the printed gel article. In some embodiments, the aerogels contain some residual solvent. The residual solvent can be up to 6 wt. % based on the total weight of the aerogel. For example, the aerogel can contain up to 5 wt. %, up to 4 wt. %, up to 3 wt. %, up to 2 wt. %, or up to 1 wt. % (e.g., organic) solvent.

The article obtained after having conducted the supercritical drying step can typically be characterized by at least one or more of the following properties:
showing a $N_2$ adsorption and/or desorption isotherm with a hysteresis loop;

showing a $N_2$ adsorption and desorption of isotherm type IV according to IUPAC classification and a hysteresis loop;

showing a $N_2$ adsorption and desorption isotherm of type IV with a hysteresis loop of type H1 according to IUPAC classification;

showing a $N_2$ adsorption and desorption isotherm of type IV with a hysteresis loop of type H1 according to IUPAC classification in a p/p0 range of 0.70 to 0.99;

Heat treating of an aerogel article or xerogel article to form a porous ceramic article may be performed (usually in an atmosphere that includes oxygen) at a temperature of 70 degrees Celsius (° C.) or greater, 80° C. or greater, 90° C. or greater, 100° C. or greater, 125° C. or greater, 150° C. or greater, 175° C. or greater, 200° C. or greater, 250° C. or greater, 300° C. or greater, 400° C. or greater, 500° C. or greater, 600° C. or greater, or 700° C. or greater; and 1200° C. or less, 1100° C. or less, 1000° C. or less, 900° C. or less, or 800° C. or less. Stated another way, heat treating may be performed at a temperature of 70° C. to 1200° C.

In some embodiments, the porous ceramic article has a sulfate equivalent less than 5 ppm and/or a chloride equivalent less than 5 ppm. The raw material used to prepare a zirconia sol, for instance, often contains chloride and sulfate impurities. Several thousand ppm by weight of these ions can be present in the porous ceramic article. If not removed, these impurities can volatilize at the temperatures used for sintering and become entrapped in the sintered body as pores. The chloride and sulfate impurities can be removed prior to sintering, for example, using ion exchange treatment. Ion exchange is optionally performed by infiltrating the porous ceramic article with a solution of ammonia in water, allowing it to sand overnight, then exchanging the ammonia solution with water several times. During this treatment ammonia reacts with the chloride and sulfate impurities to form soluble ammonia salts. These are removed by diffusion into the water. It is also possible to remove these impurities by adjusting the heating profile so that sufficient volatilization occurs in the thermal treatment used to form the porous ceramic article.

In some embodiments, the continuous method forms an article having a shape of a mill blank (e.g., a dental mill blank), such as a shape of a disc or a block, (e.g., a cube, cylinder, or cuboid). Following heat treating, the mill blank may be placed into a machining device. In such embodiments, the method of the first aspect further comprises machining the porous ceramic article (e.g., mill blank) to obtain a machined porous ceramic article (e.g., machined mill blank). The machining step is typically being done with or using a milling or grinding device, such as using a commercially available device, e.g., from 3M ESPE (under the trade designation "LAVA" Form) or from Sirona (under the trade designation "CEREC" inLab CAD/CAM). Useful milling parameters can include: rotary speed of milling tool: 5,000 to 40,000 revisions/min; feed rate: 20 to 5,000 mm/min; and milling cutter diameter: 0.8 to 4 mm.

A sintering step is finally carried out to obtain a ceramic article having a density of 94% or greater, 95% or greater, 96% or greater, 97% or greater, 98% or greater, 99% or greater, 99.5% or greater, or 99.9% or greater, of the theoretical density. Sintering of the porous ceramic article is typically carried out under the flowing conditions:

Temperature: from 900° C. to 2300° C., from 100° C. to 2000° C., from 2050° C. to 2300° C. or from 1800° C. to 2100° C.; or 900° C. or greater, 1200° C. or greater, 1400° C. or greater, above 1600° C. or greater, or 1900° C. or greater; and 2300° C. or less, 2250° C. or less, 2200° C. or less, 2150° C. or less, 2100° C. or less, 2050° C. or less, or 2000° C. or less;

Atmosphere: air or inert gas (e.g., nitrogen, argon);

Pressure: ambient pressure (e.g., 1013 mbar); and

Duration: until a density of 94% to 100% of the final density of the material has been reached.

Alternatively to ambient pressure, the sintering may be carried out at elevated pressure or decreased pressure.

Articles

In a second aspect, the present disclosure provides a ceramic article. The ceramic article is made by the method of according to the first aspect, described above in detail.

In a third aspect, the present disclosure provides an additively manufactured ceramic article. The ceramic article exhibits a density of 94% or greater with respect to a theoretical density of the ceramic material, exhibits an opacity of 80% or less, or both. All cross-sectional portions of an interior of the ceramic article having a plane with dimensions of 0.5 mm×0.5 mm, 1 mm×1 mm, 1.5 mm×1.5 mm, 2 mm×2 mm, 2.5 mm×2.5 mm, 3 mm×3 mm, 3.5 mm×3.5 mm, or 4 mm×4 mm are free of a frequency analysis signal maxima larger than a background signal Stated another way, all cross-sectional portions of an interior of the ceramic article having a plane with such dimensions (e.g., 0.5 mm×0.5 mm to 4 mm×4 mm) exhibit a frequency analysis signal to noise ratio of 3 or less or 2 or less. By "all cross-sectional portions" is meant that the ceramic article may be sliced in any direction through its interior and determined to be free of a frequency analysis signal maxima larger than a background signal. The ceramic article and density are described above in detail.

The iterative stepping, pausing, and curing of the photopolymerizable slurry or sol during layer by layer 3D printing will produce discontinuous optical properties in the bulk material of the resulting article. A cross-sectional sample of the article can be prepared to inspect for the presence of 3D printing layer artifacts. Under transmissive microscopic imaging, the cross-section of the sample often reveals an oscillating pattern that correlates to the regular discontinuities in the bulk material. The pattern may be faint and requires a method of accentuating the weak oscillation captured by an image. Since the oscillation is regular, then a frequency analysis of the image reveals a signal that can be amplified, while simultaneously suppressing other features in the image that do not contribute to the oscillation. In some embodiments, the frequency analysis is performed per the following steps:

(i) A fast Fourier transform is performed on the image
(ii) The 2-dimensional spatial power spectrum is found from the results of (i)
(iii) The peak signal is located in (ii)
(iv) An apodization filter centered on the signal peak is used to suppress the data in (i) not related to the original artifact
(v) An enhanced image is found by inverse fast Fourier transforming the filtered data in (iv).

Figure 11A:
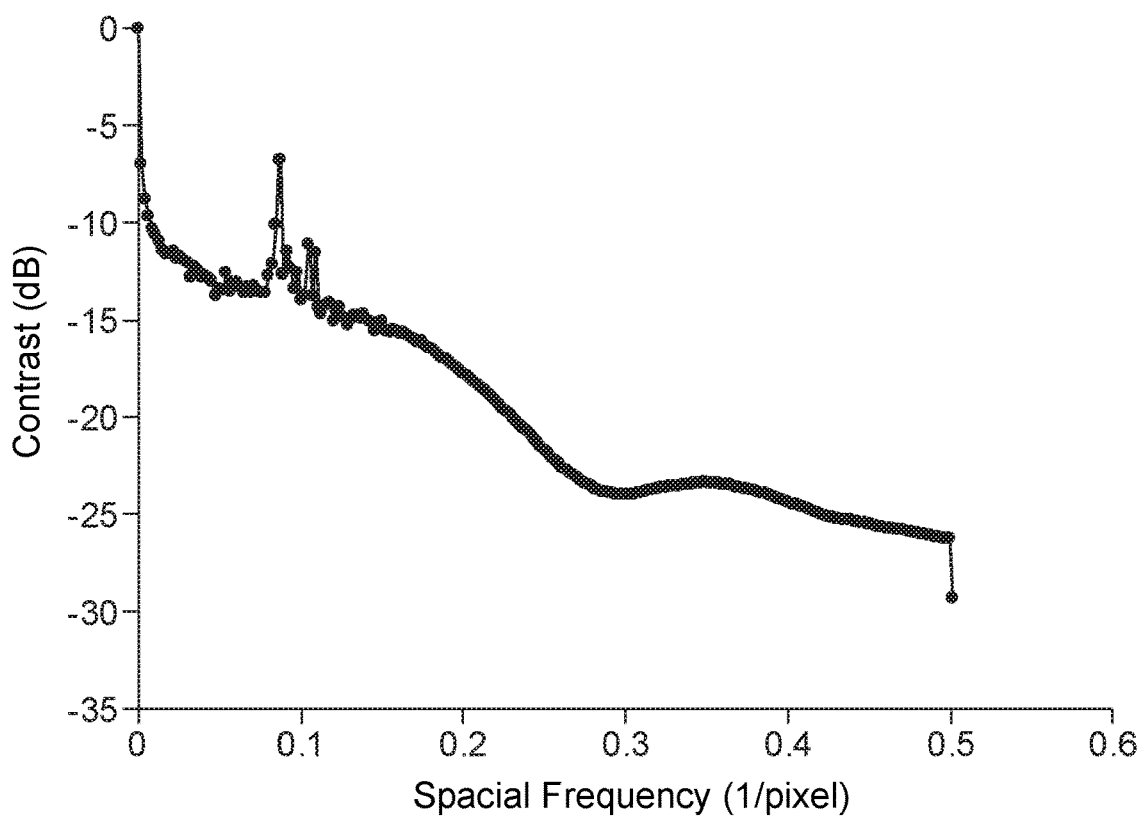
FIG. 11A is a graph of an amplified spatial frequency spectrum converted into a decibel scale, of an interior slice of a comparative ceramic article.
Figure 11B:
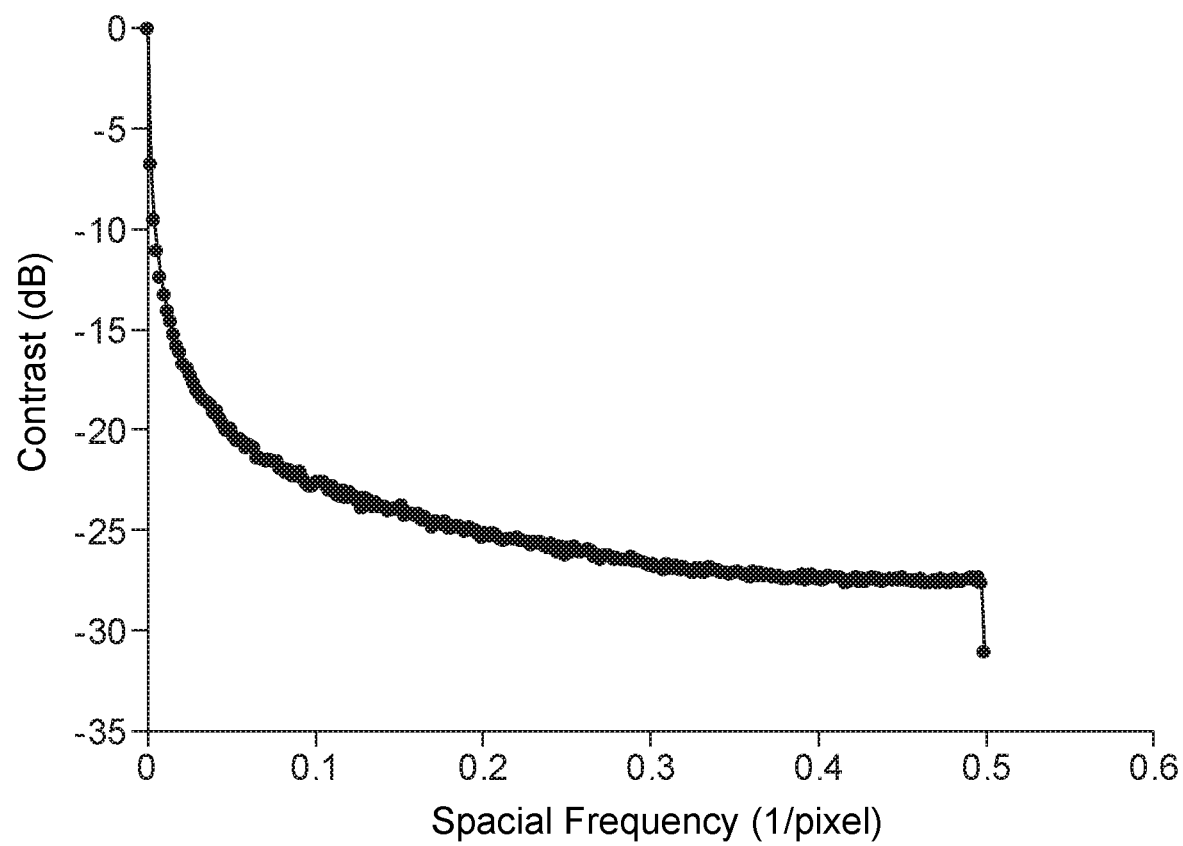
FIG. 11B is a graph of an amplified spatial frequency spectrum converted into a decibel scale, of an interior slice of a ceramic article prepared according to one embodiment of the present disclosure.

The absence of an artifact is defined by the lack of any significant signal maxima that rises above the background, as seen in part (ii) above. If no characteristic frequency of the power spectrum can be differentiated from the background, then there is no regular pattern that can be attributed to discretely layered 3D printed bulk material in the cross-sectional analysis. Referring to FIG. 11A, a graph is provided of an amplified spatial frequency spectrum converted into a decibel scale, of an interior slice of a comparative ceramic article made using layer by layer 3D printing. The graph has a signal peak with a contrast level of almost 7 decibels (dB) over the background noise. In contrast, referring to FIG. 11B, a graph is provided of an amplified spatial frequency spectrum converted into a decibel scale, of an interior slice of a ceramic article prepared according to one embodiment of the present disclosure using continuous 3D printing. The graph lacks any signal peak significantly larger than the background noise. In preferred embodiments, all cross-sectional portions of an interior of a sintered ceramic article, made by the continuous methods of the present disclosure, and having a plane with dimensions of 4 millimeters (mm)×4 mm are free of any frequency analysis signal maxima larger than a background signal.

In some embodiments, the ceramic articles define one or more tortuous or arcuate channels, one or more internal architectural voids, one or more undercuts, one or more perforations, or combinations thereof in the porous ceramic article and wherein the porous ceramic article comprises at least one feature integral to the porous ceramic article having a dimension of 0.5 mm length or less. The shape of the article is not limited, and may comprise a shaped integral article. In many embodiments, the article comprises a shaped integral article, in which more than one variation in dimension is provided by a single integral article. For example, the article can comprise one or more tortuous or arcuate channels, one or more internal architectural voids, one or more undercuts, one or more perforations, or combinations thereof. Such features are typically not possible to provide in an integral article using conventional molding methods. An "internal architectural void" refers to a void fully encompassed within the ceramic article (e.g., does not extend to any exterior surface of the ceramic article) and that has a designed shape, such as one programmed into an additive manufacturing device employed to selectively cure the photopolymerizable slurry or sol to create a shape of the ceramic article. An internal architectural void is in contrast to an internal pore formed during manufacture of the ceramic article.

In some embodiments, the sintered ceramic article advantageously exhibits an opacity of 80% or less, 75% or less, or 70% or less; and 1% or more, 10% or more, 20% or more, 30% or more, 40% or more, 50% or more, or 60% or more. The opacity relates to the ceramic article's ability to transmit light. As used herein, the term "light" refers to electromagnetic radiation, whether visible to the unaided human eye or not. Ultraviolet light is light having a wavelength in a range from about 250 nanometers (nm) to 380 nm. Visible light is light having a wavelength in a range from 380 nanometers (nm) to 700 nm. Infrared light has a wavelength in a range from about 700 nm to 300 micrometers. In some embodiments, suitable actinic radiation provides a wavelength in a range from 220 nm to 550 nm. Opacity measurements can be conducted according to ASTM E-284 using a Lab Scan XE spectrophotometer (Hunterlab, Reston, Va.). Opacity is measured using a spectrophotometer with the "L" value measured separately against a black background and against a white background, respectively. The opacity is calculated as (L measured against the black background/L measured against the white background) times 100, and reported in units of %. The "L" value is one of three standard parameters in the CIELAB color space scale established by the International Commission on Illumination. "L" is a brightness value, ranging from 0 (black) to 100 (highest intensity).

In some embodiments, the sintered ceramic article advantageously exhibits a flexural strength of 100 megaPascals (MPa) or greater, 200 MPa, 300 MPa, 400 MPa, 500 MPa, 600 MPa, 700 MPa, 800 MPa, 900 MPa, 1000 MPa, 1100 MPa, or 1200 MPa or greater; and 2000 MPa or less, 1900 MPa, 1800 MPa, 1700 MPa, 1600 MPa, 1500 MPa, 1400 MPa, or 1300 MPa or less. Flex strength can be determined using ISO 6872 (2008) after forming a sintered ceramic article in the shape of a test bar having dimensions of approximately 1 mm×4 mm×12 mm. Additional details of the test method are provided in the examples below.

SELECT EMBODIMENTS OF THE DISCLOSURE

Embodiment 1 is an additive manufacturing method of making a ceramic article. The method includes (a) obtaining a photopolymerizable slurry or sol including a plurality of ceramic particles distributed in the photopolymerizable slurry or sol and (b) selectively polymerizing the photopolymerizable slurry or sol using actinic radiation and continuous movement of a build substrate through the photopolymerizable slurry or sol to form a gelled article. Next, the method includes (c) extracting solvent from the gelled article to form an aerogel article or a xerogel article; (d) heat treating the aerogel article or the xerogel article to form a porous ceramic article; and (e) sintering the porous ceramic article to form a sintered ceramic article. The sintered ceramic article exhibits a density of 94% or greater with respect to a theoretical density of the ceramic material.

Embodiment 2 is the method of embodiment 1, wherein the actinic radiation is directed at the photopolymerizable slurry or sol from above the photopolymerizable slurry or sol.

Embodiment 3 is the method of embodiment 1 or embodiment 2, wherein the photopolymerizable slurry or sol is provided in a container and the build substrate moves towards a floor of the container during the selective polymerization of the photopolymerizable slurry or sol.

Embodiment 4 is the method of any of embodiments 1 to 3, wherein the actinic radiation is provided by a projector projecting a sequence of two-dimensional images.

Embodiment 5 is the method of any of embodiments 1 to 4, wherein the extracting is performed using supercritical fluid.

Embodiment 6 is the method of any of embodiments 1 to 5, wherein the heat treating is performed at a temperature of 70 degrees Celsius to 1200 degrees Celsius.

Embodiment 7 is the method of any of embodiments 1 to 6, wherein the sintering is performed at ambient pressure.

Embodiment 8 is the method of any of embodiments 1 to 7, wherein the sintering is performed at a temperature of 900 to 2300 degrees Celsius.

Embodiment 9 is the method of any of embodiments 1 to 8, wherein the sintered ceramic article exhibits a density of 95% or greater, 96% or greater, 97% or greater, or 98% or greater, with respect to a theoretical density of the ceramic material.

Embodiment 10 is the method of any of embodiments 1 to 9, wherein all cross-sectional portions of an interior of the sintered ceramic article having a plane with dimensions of 0.5 millimeters (mm)×0.5 mm, 1 mm×1 mm, 1.5 mm×1.5 mm, 2 mm×2 mm, 2.5 mm×2.5 mm, 3 mm×3 mm, 3.5 mm×3.5 mm, or 4 mm×4 mm, are free of any frequency analysis signal maxima larger than a background signal.

Embodiment 11 is the method of any of embodiments 1 to 10, wherein the sintered ceramic article exhibits an opacity of 80% or less.

Embodiment 12 is the method of any of embodiments 1 to 11, wherein the sintered ceramic article exhibits a flex strength of 100 megapascals (MPa) or greater, 200 MPa or greater, 300 MPa or greater, 400 MPa or greater, 500 MPa or greater, 600 MPa or greater, 700 MPa or greater, 800 MPa or greater, 900 MPa or greater, 1000 MPa or greater, 1100 MPa or greater, or 1200 MPa or greater.

Embodiment 13 is the method of any of embodiments 1 to 12, wherein the gelled article is formed at a rate of 0.5 millimeters per minute (mm/min) or greater in the build axis, 0.7 mm/min or greater in the build axis, or 0.9 mm/min or greater in the build axis.

Embodiment 14 is the method of any of embodiments 1 to 13, wherein the photopolymerizable slurry or sol includes 20 to 60 wt. % of ceramic particles, based on the total weight of the photopolymerizable slurry or sol.

Embodiment 15 is the method of any of embodiments 1 to 13, wherein the photopolymerizable slurry or sol includes 3 to 45 vol. % of ceramic particles, based on the total volume of the photopolymerizable slurry or sol.

Embodiment 16 is the method of any of embodiments 1 to 15, wherein the ceramic particles include metal oxide ceramic particles, non-oxide ceramic particles, or combinations thereof.

Embodiment 17 is the method of any of embodiments 1 to 16, wherein the ceramic particles are selected from the group consisting of zirconia, silica, alumina, yttria, ceria, magnesium-magnesia aluminate (MMA), magnesium oxide, hydroxyapatite, fluorapatite, chlorapatite, calcite, cordierite, silicon carbide, silicon nitride, boron carbide, titanium diboride, zirconium diboride, boron nitride, titanium carbide, zirconium carbide, aluminum nitride, calcium hexaboride, MAX phase, and combinations thereof.

Embodiment 18 is the method of any of embodiments 1 to 17, wherein the ceramic particles have an average particle size diameter of 1 nanometer (nm) to 900 nm, 1 nm to 500 nm, 1 nm to 250 nm, or 1 nm to 100 nm.

Embodiment 19 is the method of any of embodiments 1 to 17, wherein the ceramic particles have an average particle size diameter of 250 nm to 10 micrometers, 1 micrometer to 10 micrometers, or 500 nm to 1.5 micrometers.

Embodiment 20 is the method of any of embodiments 1 to 19, wherein the photopolymerizable slurry or sol includes at least one radiation curable monomer.

Embodiment 21 is the method of embodiment 20, wherein the at least one radiation curable monomer includes a (meth)acrylate, an epoxy, a silane, or combinations thereof.

Embodiment 22 is the method of any of embodiments 1 to 21, wherein the photopolymerizable slurry or sol includes at least one photoinitiator.

Embodiment 23 is the method of any of embodiments 1 to 21, wherein the photopolymerizable slurry or sol includes at least one photoinhibitor.

Embodiment 24 is the method of any of embodiments 1 to 23, wherein the photopolymerizable slurry or sol includes at least one sintering aid.

Embodiment 25 is the method of any of embodiments 1 to 24, wherein the photopolymerizable slurry or sol includes 10 to 70% by weight solvent, based on the total weight of the photopolymerizable slurry or sol.

Embodiment 26 is the method of embodiment 25, wherein the solvent is selected from the group consisting of diethylene glycol monoethyl ether, ethanol, 1-methoxy-2-propanol, N-methyl pyrrolidone, water, and combinations thereof.

Embodiment 27 is the method of any of embodiments 1 to 26, wherein the photopolymerizable slurry or sol exhibits a viscosity of less than 500 mPa·s at 23 degrees Celsius.

Embodiment 28 is the method of any of embodiments 1 to 27, wherein the photopolymerizable slurry or sol is a sol.

Embodiment 29 is the method of any of embodiments 1 to 27, wherein the photopolymerizable slurry or sol is a slurry.

Embodiment 30 is the method of any of embodiments 1 to 29, wherein the actinic radiation provides a wavelength in a range from 220 nm to 550 nm.

Embodiment 31 is the method of any of embodiments 1 to 30, wherein the actinic radiation is provided at an intensity of 1 to 50 milliwatts per square centimeter (mW/cm$^2$).

Embodiment 32 is the method of any of embodiments 1 to 31, wherein the porous ceramic article is a mill blank and the method further comprises machining the porous ceramic article to obtain a machined porous ceramic article.

Embodiment 33 is the method of any of embodiments 1 to 32, further comprising ion exchange treatment of the porous ceramic article.

Embodiment 34 is the method of any of embodiments 1 to 33, further including moving the gelled article and thereby generating a mass inertial force in uncured photopolymerizable slurry or sol disposed on the gelled article, thereby forming a coating layer of uncured photopolymerizable slurry or sol on the gelled article, wherein the mass inertial force is generated using a centrifuge, a shaker, or a mixer that spins along one or more axes.

Embodiment 35 is the method of any of embodiments 1 to 34, further including, prior to step b), retrieving, from a non-transitory machine readable medium, data representing a 3D model of a gelled article; and executing, by one or more processors, a 3D printing application interfacing with a manufacturing device using the data to generate, by the manufacturing device, a physical object of the gelled article.

Embodiment 36 is the method of any of embodiments 1 to 34, further including, prior to step b), receiving, by a manufacturing device having one or more processors, a digital object comprising data specifying a gelled article; and generating, with the manufacturing device by an additive manufacturing process, the gelled article based on the digital object.

Embodiment 37 is ceramic article made by the method of any of embodiments 1 to 36.

Embodiment 38 is an additively manufactured ceramic article. The ceramic article exhibits a density of 94% or greater with respect to a theoretical density of the ceramic material, exhibits an opacity of 80% or less, or both. All cross-sectional portions of an interior of the ceramic article having a plane with dimensions of 0.5 mm×0.5 mm, 1 mm×1 mm, 1.5 mm×1.5 mm, 2 mm×2 mm, 2.5 mm×2.5 mm, 3 mm×3 mm, 3.5 mm×3.5 mm, or 4 mm×4 mm, are free of a frequency analysis signal maxima larger than a background signal.

EXAMPLES

Objects and advantages of this disclosure are further illustrated by the following examples, but the particular materials and amounts thereof recited in these examples, as well as other conditions and details, should not be construed to unduly limit this disclosure. Unless otherwise indicated, all parts and percentages are on a weight basis, all water is de-ionized water, and all molecular weights are weight average molecular weight. Moreover, unless otherwise indicated all experiments were conducted at ambient conditions (23° C.; 1013 mbar).

Materials

| Material or abbreviation | Description |
|---|---|
| Zirconium acetate | An aqueous solution of zirconium acetate containing nominally 16.3 weight percent zirconium obtained from Magnesium Elektron. Inc. (Flemington, NJ, USA). The aqueous solution was exposed to an ion exchange resin (obtained under the trade designation "AMBERLYTE IR 120" from Rohm and Haas Company (Philadelphia, PA, USA) before use (oxide content 21.55 wt. %). |
| Yttrium acetate | Yttrium (III) acetate tetrahydrate obtained from Molycorp Inc. (Mountain Pass, CA) (oxide content 34.65 wt. %). |
| Lanthanum oxide | Lanthanum (III) oxide (oxide content 99.1%) obtained from NEO Performance Materials, Toronto, Ontario, Canada. |
| Bismuth acetate | Bismuth (III) acetate (oxide content 52.38 wt. %) obtained from Alfa Aesar (Ward Hill, MA, USA). |
| DI water | De-ionized water. |
| Diethylene glycol monoethyl ether | Diethylene glycol monoethyl ether obtained from Alfa Aesar (Ward Hill, MA, USA). |
| "OMNIRAD 819" | UV/Visible photoinitiator obtained from 1GM Resins (Waalwijk, The Netherlands) under the trade designation "OMNIRAD 819". |
| MEEAA | 2-[2-(2-Methoxyethoxy)ethoxy]acetic acid obtained from Sigma-Aldrich (St. Louis, MO, USA). |
| Acrylic acid | Acrylic acid obtained from Alfa Aesar (Ward Hill, MA, USA). |
| HEA | Hydroxyethyl acrylate obtained from Alfa Aesar (Ward Hill, MA, USA). |
| "SR506 C" | Isobornyl acrylate obtained from Sartomer USA (Exton, PA, USA) under the trade designation "SR506 C". |
| Octyl acrylate | Octyl acrylate, prepared as described in Example 4 of U.S. Pat. No. 9,908,837. |
| "SR238 B" | 1,6-Hexanediol diacrylate obtained from Sartomer USA (Exton, PA, USA) under the trade designation "SR238 B". |
| "SR351 H" | Trimethylolpropane triacrylate obtained from Sartomer USA (Exton, PA, USA) under the trade designation "SR351 H". |
| "SR295" | Pentaerythritol tetraacrylate obtained from Sartomer USA (Exton, PA, USA) under the trade designation "SR295". |
| "CN975" | Hexafunctional methane acrylate obtained from Sartomer USA (Exton, PA, USA) under the trade designation "CN975". |
| BHT | 2,6-Di-tert-butyl-4-methyl-phenol (Butylated hydroxytoluene) obtained from Fluka Analytical (St. Louis, MO, USA). |
| Ammonium Hydroxide | Ammonium Hydroxide (assay 28-30 wt. % as $NH_3$) obtained from EMD Chemicals Inc. (Gibbstown, NJ, USA). |

Methods
Method for Crystalline Structure and Size (XRD Analysis)

Dried zirconia samples were ground by hand using an agate mortar and pestle. A liberal amount of the sample was applied by spatula to a glass microscope slide on which a section of double sided adhesive tape had been adhered. The sample was pressed into the adhesive on the tape by forcing the sample against the adhesive with the spatula blade. Excess sample was removed by scraping the sample area with the edge of the spatula blade, leaving a thin layer of particles adhered to the adhesive. Loosely adhered materials remaining after the scraping were removed by forcefully tapping the microscope slide against a hard surface. In a similar manner, corundum (Linde 1.0 μm alumina polishing powder, Lot Number C062, Union Carbide, Indianapolis, IN) was prepared and used to calibrate the X-ray diffractometer for instrumental broadening.

X-ray diffraction scans were obtained using a Philips vertical diffractometer having a reflection geometry, copper $K_\alpha$ radiation, and a proportional detector registry of the scattered radiation. The diffractometer was fitted with variable incident beam slits, fixed diffracted beam slits, and a graphite diffracted beam monochromator. The survey scan was recorded from 25 to 55 degrees two theta (2θ) using a step size of 0.04 degrees and a dwell time of 8 seconds. X-ray generator settings of 45 kV and 35 mA were used. Data for the corundum standard was collected on three separate areas of several individual corundum mounts. Likewise, data was collected on three separate areas of the thin layer sample mount.

The observed diffraction peaks were identified by comparison to reference diffraction patterns contained within the International Center for Diffraction Data (ICDD) powder diffraction database (sets 1-47, ICDD, Newton Square, PA, USA). The diffraction peaks for the samples were attributed to either cubic/tetragonal (C/T) or monoclinic (M) forms of zirconia. For zirconia-based particles, the (111) peak for the cubic phase and (101) peak for the tetragonal phase could not be separated so these phases were reported together. The amounts of each zirconia form were evaluated on a relative basis and the form of zirconia having the most intense diffraction peak was assigned the relative intensity value of 100. The strongest line of the remaining crystalline zirconia form was scaled relative to the most intense line and given a value between 1 and 100.

Peak widths for the observed diffraction maxima due to corundum were measured by profile fitting. The relationship between mean corundum peak widths and corundum peak position (2θ) was determined by fitting a polynomial to these data to produce a continuous function used to evaluate the instrumental breadth at any peak position within the corundum testing range. Peak widths for the observed diffraction maxima due to zirconia were measured by profile fitting the observed diffraction peaks. The following peak widths were evaluated depending on the zirconia phase found to be present:

Cubic/Tetragonal (C/T): (1 1 1)

Monoclinic (M): (−1 1 1), and (1 1 1)

A Pearson VII peak shape model with $K_{\alpha 1}$ and $K_{\alpha 2}$ wavelength components and linear background model were used for all measurements. Widths were calculated as the peak full width at half maximum (FWHM) having units of degrees. The profile fitting was accomplished by use of the capabilities of the JADE diffraction software suite. Sample peak widths were evaluated for the three separate data collections obtained for the same thin layer sample mount.

Sample peaks were corrected for instrumental broadening by interpolation of instrumental breadth values from corundum instrument calibration and corrected peak widths converted to units of radians. The Scherrer equation was used to calculate the primary crystal size.

Crystallite Size $(D)=K\lambda/\beta(\cos \theta)$

In the Scherrer equation, K is the form factor (here 0.9), $\lambda$ is the wavelength (1.540598 Å), $\beta$ is the calculated peak width after correction for instrumental broadening (in radians), and $\theta$ equals half the peak position (scattering angle). $\beta$ is equal to [calculated peak FWHM−instrumental breadth] (converted to radians) where FWHM is full width at half maximum. The cubic/tetragonal (C/T) mean crystallite size was measured as the average of three measurements using (1 1 1) peak. That is, C/T mean crystallite size=$[D(1\ 1\ 1)_{area\ 1}+D(1\ 1\ 1)_{area\ 2}+D(1\ 1\ 1)_{area\ 3}]/3$.

The monoclinic (M) crystallite size was measured as the average of three measurements using the (−1 1 1) peak and three measurements using the (1 1 1) peak.

M mean crystallite size=$[D(-1\ 1\ 1)_{area\ 1}+D(-1\ 1\ 1)_{area\ 2}+D(-1\ 1\ 1)_{area\ 3}+D(1\ 1\ 1)_{area\ 1}+D(1\ 1\ 1)_{area\ 2}+D(1\ 1\ 1)_{area\ 3}]/6$ The weighted average of the cubic/tetragonal (C/T) and monoclinic phases (M) were calculated.

Weighted average=$[(\% C/T)(C/T\ size)+(\% M)(M\ size)]/100$

In this equation, % C/T equals the percent crystallinity contributed by the cubic and tetragonal crystallite content of the $ZrO_2$ particles; C/T size equals the size of the cubic and tetragonal crystallites; % M equals the percent crystallinity contributed by the monoclinic crystallite content of the $ZrO_2$ particles; and M size equals the size of the monoclinic crystallites.

Method for Photon Correlation Spectroscopy (PCS)

Particle size measurements were made using a light scattering particle sizer equipped with a red laser having a 633 nm wavelength of light (obtained under the trade designation "ZETA SIZER—Nano Series, Model ZEN3600" from Malvern Instruments Inc., Westborough, MA). Each sample was analyzed in a one centimeter square polystyrene sample cuvette. The sample cuvette was filled with about 1 gram of deionized water, and then a few drops (about 0.1 gram) of the zirconia-based sol were added. The composition (e.g., sample) within each sample cuvette was mixed by drawing the composition into a clean pipette and discharging the composition back into the sample cuvette several times. The sample cuvette was then placed in the instrument and equilibrated at 25° C. The instrument parameters were set as follows: dispersant refractive index 1.330, dispersant viscosity 0.8872 MPa-second, material refractive index 2.10, and material absorption value 0.10 units. The automatic size-measurement procedure was then run. The instrument automatically adjusted the laser-beam position and attenuator setting to obtain the best measurement of particle size.

The light scattering particle sizer illuminated the sample with a laser and analyzed the intensity fluctuations of the light scattered from the particles at an angle of 173 degrees. The method of Photon Correlation Spectroscopy (PCS) was used by the instrument to calculate the particle size. PCS uses the fluctuating light intensity to measure Brownian motion of the particles in the liquid. The particle size is then calculated to be the diameter of sphere that moves at the measured speed.

The intensity of the light scattered by the particle is proportional to the sixth power of the particle diameter. The Z-average size or cumulant mean is a mean calculated from the intensity distribution and the calculation is based on assumptions that the particles are mono-modal, mono-disperse, and spherical. Related functions calculated from the fluctuating light intensity are the Intensity Distribution and its mean. The mean of the Intensity Distribution is calculated based on the assumption that the particles are spherical. Both the Z-average size and the Intensity Distribution mean are more sensitive to larger particles than smaller ones.

The Volume Distribution gives the percentage of the total volume of particles corresponding to particles in a given size range. The volume-average size is the size of a particle that corresponds to the mean of the Volume Distribution. Since the volume of a particle is proportional to the third power of the diameter, this distribution is less sensitive to larger particles than the Z-average size. Thus, the volume-average will typically be a smaller value than the Z-average size.

Method for Determining Dispersion Index (DI)

The dispersion index is equal to the volume-average size measured using Photon Correlation Spectroscopy divided by the weighted average crystallite size measured by XRD.

Method for Determining Polydispersity Index (PI)

The polydispersity index is a measure of the breadth of the particle size distribution and is calculated along with the Z-average size in the cumulant analysis of the intensity distribution using Photon Correlation Spectroscopy. For values of the polydispersity index of 0.1 and below, the breadth of the distribution is considered narrow. For values above 0.5, the breadth of the distribution is considered broad and it is unwise to rely on the Z-average size to fully characterize the particle size. Instead, one should characterize the particles using a distribution analysis such as the intensity or volume distribution. The calculations for the Z-average size and polydispersity index are defined in the ISO 13321:1996 E ("Particle size analysis—Photon correlation spectroscopy", International Organization for Standardization, Geneva, Switzerland).

Method for Measuring Oxide Content

The oxide content was measured via thermal gravimetric analysis (obtained under the trade designation "TGA Q500" from TA Instruments, New Castle, DE, USA). The sample (about 50 mg) was loaded into the TGA and the temperature was taken to 900° C. in air. The oxide content of the sample was equal to the residual weight after heating to 900° C.

Sol Batch Preparation

Preparation of Sol-S1a and Sol-S2a

Sol-S1a and Sol-S2b were prepared as described in WO2016191534 (Examples Section—Processing: Preparation of Sol-S1), except that the composition and temperature were varied. The compositions and reaction temperatures for Sol-S1a and Sol-S2a are listed in Table 1, below.

TABLE 1

| Sol | Temperature (° C.) | Mole % ZrO$_2$ | Mole % Y$_2$O$_3$ | Mole % La$_2$O$_3$ | Mole % Bi$_2$O$_3$ |
|---|---|---|---|---|---|
| Sol-S1a | 225 | 95.74 | 4.24 | — | 0.02 |
| Sol-S2a | 225 | 89.9 | 9.6 | 0.5 | — |

The properties of Sol-S1a and Sol-S2a were determined using the methods described above. Table 2, below, summarizes the PCS data for Sol-S1a and Sol-S2a, including the Z-Average size (nm) and Polydispersity Index (PI).

TABLE 2

| Sol | Z-Average Size (nm) | PI | Volume Average Size (nm) |
|---|---|---|---|
| Sol-S1a | 15.02 | 0.381 | 4.77 |
| Sol-S2a | 16.29 | 0.228 | 11.75 |

Table 3, below, summarizes the crystallite size and dispersion index (DI) data for Sol-S1a and Sol-S2a, determined from XRD analysis and Photon Correlation Spectroscopy, as described above.

TABLE 3

| Sol | C/T intensity | C/T size (nm) |
|---|---|---|
| Sol- S1a | 100 | 7.1 |
| Sol- S2a | 100 | 5.4 |

Sol-S1a and Sol-S2a were further processed to increase their concentration, remove acetic acid or incorporate ethanol. A combination of one or more of ultrafiltration, diafiltration and distillation were used. The diafiltration and ultrafiltration were performed using a membrane cartridge (obtained under the trade designation "M21S-100-01P" from Spectrum Laboratories Inc., Rancho Dominguez, CA). Distillation was performed using rotary evaporation.

Preparation of Sol-S1b

A diethylene glycol monoethyl ether-based sol, Sol-S1b, was produced by adding 2-[2-(2-methoxyethoxy)ethoxy] acetic acid (MEEAA) (3.56 wt. % with respect to the grams of oxide in the sol) and the appropriate amount of diethylene glycol monoethyl ether (adjusted to the intended final concentration of zirconia in the sol, e.g., 55 wt. %) to a portion of Sol-Sla, and concentrating the sol via rotary evaporation. The resulting sol was 56.35 wt. % oxide and 5.26 wt. % acetic acid.

Preparation of Sol-S1c

A diethylene glycol monoethyl ether based sol, Sol-S1c, was produced by adding 2-[2-(2-methoxyethoxy)ethoxy] acetic acid (MEEAA) (3.56 wt. % with respect to the grams of oxide in the sol) and the appropriate amount of diethylene glycol monoethyl ether (adjusted to the intended final concentration of zirconia in the sol, e.g., 55 wt. %) to a portion of Sol-Sla, and concentrating the sol via rotary evaporation. The resulting sol was 55.19 wt. % oxide and 7.23 wt. % acetic acid.

Preparation of Sol-S2b

A diethylene glycol monoethyl ether-based sol, Sol-S2b, was produced by adding 2-[2-(2-methoxyethoxy)ethoxy] acetic acid (MEEAA) (7.12 wt. % with respect to the grams of oxide in the sol) and the appropriate amount of diethylene glycol monoethyl ether (adjusted to the intended final concentration of zirconia in the sol, e.g., 50 wt. %) to Sol-S2a, and concentrating the sol via rotary evaporation. The resulting sol was 51.79 wt. % oxide and 8.02 wt. % acetic acid.

Printing Sol Preparation

Preparation of Printing Sol PS1

To prepare printing sol PS1, a portion of Sol-S1b (969.69 grams) was charged to a 1-liter bottle and combined with diethylene glycol monoethyl ether (178.43 grams), acrylic acid (59.06 grams), hydroxyethyl acrylate (HEA) (11.21 grams), octyl acrylate (5.58 grams), trimethylolpropane triacrylate ("SR351 H") (98.74 grams), and a hexafunctional urethane acrylate ("CN975") (49.27 grams). Prior to printing, OMNIRAD 819 (0.5 wt. % with respect to the weight of the sol) and butylated hydroxytoluene (BHT) (0.1 wt. % with respect to the weight of the sol) were dissolved in the sol. The printing sol was then passed through a 1-µm filter.

Preparation of Printing Sol PS2

To prepare printing sol PS2, a portion of Sol-S1b (401.35 grams) was charged to a 500-ml bottle and combined with diethylene glycol monoethyl ether (95.10 grams), acrylic acid (24.45 grams), isobornyl acrylate ("SR506 C") (21.23 grams), 1,6-hexanediol diacrylate ("SR238 B") (8.71 grams), and pentaerythritol tetraacrylate ("SR295") (11.27 grams). Prior to printing, OMNIRAD 819 (0.5 wt. % with respect to the weight of the sol) and butylated hydroxytoluene (BHT) (0.1 wt. % with respect to the weight of the sol) were dissolved in the sol. The printing sol was then passed through a 1-µm filter.

Preparation of Printing Sol PS3

To prepare printing sol PS3, a portion of Sol-S1c (732.55 grams) was charged to a 1-liter bottle and combined with diethylene glycol monoethyl ether (153.79 grams), acrylic acid (43.70 grams), octyl acrylate (33.52 grams), 1,6-hexanediol diacrylate ("SR238 B") (15.55 grams), and a hexafunctional urethane acrylate ("CN975") (28.04 grams). Prior to printing, OMNIRAD 819 (0.5 wt. % with respect to the weight of the sol) and butylated hydroxytoluene (BHT) (0.1 wt. % with respect to the weight of the sol) were dissolved in the sol. The printing sol was then passed through a 1-µm filter.

Preparation of Printing Sol PS4

To prepare printing sol PS4, a portion of Sol-S1b (215.25 grams) was charged to a 250-ml bottle and combined with diethylene glycol monoethyl ether (49.03 grams), acrylic acid (13.11 grams), isobornyl acrylate ("SR506 C") (11.37 grams), 1,6-hexanediol diacrylate ("SR238 B") (4.67 grams), and a hexafunctional urethane acrylate ("CN975") (8.41 grams). Prior to printing, OMNIRAD 819 (0.5 wt. % with respect to the weight of the sol) and butylated hydroxytoluene (BHT) (0.1 wt. % with respect to the weight of the sol) were dissolved in the sol. The printing sol was then passed through a 1-µm filter.

Preparation of Printing Sol PS5

To prepare printing sol PS5, a portion of Sol-S2b (230.10 grams) was charged to a 250-ml bottle and combined with diethylene glycol monoethyl ether (22.08 grams), acrylic acid (12.88 grams), hydroxyethyl acrylate (HEA) (2.44 grams), octyl acrylate (1.22 grams), trimethylolpropane triacrylate ("SR351 H") (21.53 grams), and a hexafunctional urethane acrylate ("CN975") (10.75 grams). Prior to printing, OMNIRAD 819 (0.2 wt. % with respect to the weight of the sol) and butylated hydroxytoluene (BHT) (0.05 wt. % with respect to the weight of the sol) were dissolved in the sol. The printing sol was then passed through a 1-µm filter.

Method for Continuous 3D Printing of Examples

To print objects from ceramic sol with continuous printing, the following procedure was used. The continuous 3D printer included a projector (Qumi) for illumination. The projector had a peak wavelength of 405 nm and intensity of 15 mW/cm². A vat was made by thermoforming a plastic sheet over a metal cube. A build platform was connected to a linear axis and Nema 17 stepper motor. The stepper motor was connected to an Arduino Mega 2560 microcontroller and RAMPS 1.4. Marlin code v1.1 was programmed onto the Arduino, and hterm software was used to communicate the build plate speed and location. A custom software converted an STL file into a video of slices. The video was projected toward the vat while the build plate moved into the vat.

First, the vat was filled with printing sol. The projector faced down toward the vat and was focused to the top of the vat. Then the video of the sequence of slices from the selected file was projected. The build plate was positioned at the top of the vat and held in the same position for approximately 30 seconds for a burn-in layer. Then the build plate was moved down into the vat at a consistent rate of 1 mm/minute, while the sequence of slices continued to be projected toward the vat. After projecting the sequence of slices, the build plate moved up to the initial position, and the printed parts (e.g., gelled articles) were removed. Printed gel samples were washed by soaking with diethylene glycol monoethyl ether for about 30 seconds, and then placed in a sealed container until the next step.

Method for Layer-by-Layer 3D Printing of Comparative Examples

To print objects from ceramic sol with traditional layer-by-layer printing, the following procedure was used. A build tray was assembled with a fluoropolymer release film. Approximately 50 mL of a sol was loaded into the build tray at room temperature. Caution was taken to prevent light exposure by performing procedures in a UV-filtered room (yellow lights), or in low-light conditions when UV-filtering was not available. The build platform was abraded with sand paper and cleaned with IPA as needed. A. STL file was loaded into the software and support structures were applied as required. The settings for printing in the ASIGA PICO PLUS 27 stereolithography printer (from Asiga, Sydney, Australia) are listed in Table 4, below.

TABLE 4

Standard settings for build using the ASIGA PICO PLUS 27 3D printer.

| Setting | Min | Max | Typical | Units |
| --- | --- | --- | --- | --- |
| Slice Thickness | 0.001 | 0.05 | 0.05 | mm |
| Separation Distance | 2 | 10 | 4 | mm |
| Separation Velocity | 0.15 | 15 | 2 | mm/s |
| Approach Velocity | 1 | 15 | 2 | mm/s |
| Sliders per layer | 0 | 4 | 1 | |
| Exposure Time | 0.5 | 45 | 1.05 | s |
| Power | 15 | 30 | 20 | mW/cm² |

After building, the gel sample was immediately removed from the build platform and rinsed briefly with clean diethylene glycol monoethyl ether solvent. It was then placed in a sealed container until the next step.

Method for Supercritical Fluid Extraction

The printed gel body was dried via supercritical fluid extraction, for example as described in the Method for Supercritical Extraction of Gels in the Examples section of WO 2016/191534 (Mayr et al).

Method for Burnout and Pre-sinter

The dried gel body was placed on a bed of zirconia beads in an alumina crucible. The crucible was covered with alumina plates and then fired in air according to the following schedule:

1—Heat from 20° C. to 220° C. at 18° C./hour rate,
2—Heat from 220° C. to 244° C. at 1° C./hour rate,
3—Heat from 244° C. to 400° C. at 6° C./hour rate,
4—Heat from 400° C. to 1020° C. at 60° C./hour rate,
5—Cool from 1020° C. to 20° C. at 120° C./hour rate.

Method for Ion Exchange

The pre-sintered body was placed in a 118-ml glass jar containing 1.0N $NH_4OH$ at a depth of about 2.5 cm and soaked for at least 16 hours. The $NH_4OH$ was then poured off and the jar was filled with distilled water. The body was soaked in the distilled water for 1 hour. The water was then replaced with fresh distilled water. This step was repeated until the pH of the soak water was equal to that of fresh distilled water. The body was then dried at 90-125° C. for a minimum of 15 minutes.

Method for Sintering

The pre-sintered, ion-exchanged body was placed on a bed of zirconia beads in an alumina crucible. The crucible was covered with alumina plates, and the sample was sintered in air according to the following schedule:

1—Heat from 20° C. to 1020° C. at 500° C./hour rate,
2—Heat from 1020° C. to 1320° C. at 120° C./hour rate,
3—Hold at 1320° C. for 2 hours,
4—Cool down from 1320° C. to 20° C. at 500° C./hour rate.

Method for Measuring Archimedes Density

The density of the sintered material was measured by the Archimedes technique. The measurements were made on a precision balance (identified as "XSE204" from Mettler-Toledo, LLC, Columbus, OH, USA) using a density determination kit (identified as "Density Determination Kit for Excellence XP/XS Analytical Balances" from Mettler-Toledo, LLC, Columbus, OH, USA). The sample was first weighed in air (A), then immersed in water and weighed (B). The water was distilled and deionized. Three drops of a wetting agent (obtained under trade designation "PER VITRO 75%" from Mettler-Toledo, LLC, Columbus, OH, USA) was added to 250 ml of water. The density was calculated using the balance density function, which used the formula $\rho=(A/(A-B))\ (\rho_0-\rho_L)+\rho_L$, where $\rho_0$ is the density of water and $\rho_L$ is the density of air (0.0012 g/cm³). The relative density can be calculated by reference to the theoretical density ($\rho_t$) of the material, $\rho_{rel}=(\rho/\rho_t)*100$.

Method for Measuring Flexural Strength of Ceramic Articles

The flexural strength was determined according to ISO 6872 (2008). The printed ceramic test piece was in the shape of a flex bar, with dimensions of approximately 1 millimeter (mm)×4 mm×12 mm after sintering. The parallel large faces of the flex bar were polished to a surface finish of 15 microns using diamond lapping film (668X Diamond Lapping Film PSA, 3M, St. Paul, MN) on a Beta, Grinder-Polisher (Buehler, Lake Bluff, IL), operating at 100 rpm and lubricated with water. Each of the 4 edges along the length of the flex bar were chamfered, meaning to create a bevel on the edges of the specimens along the length, to a 45 degree angle. A 3-point beam bend test configuration with a span of 10.0 mm was employed. The crosshead test speed was 1 mm/minute. An Instron 5954 test frame (Instron Corporation, Canton, MA) was utilized for testing.

Method for Measuring Opacity of Ceramic Articles

The opacity of a ceramic article was evaluated with the following procedure. After sintering, the dimensions of the printed ceramic test piece were approximately 1 mm±0.03 mm thick×13 mm×13 mm. The parallel large faces of the sample were polished to a surface finish of 15 micron grade diamond lapping film (668X Diamond Lapping Film PSA, 3M, St. Paul, MN) on a Beta, Grinder-Polisher (Buehler, Lake Bluff, IL), operating at 100 rpm and lubricated with water. The polished sample was measured with a spectrophotometer (X-Rite Color i7, Grand Rapids, MI, USA) in reflectance mode. Translucency (T) was determined according to T=1-RB/RW where RB is the reflectance through a ceramic sample on a black substrate and RW is the reflectance through the same sample on a white substrate. Higher values of translucency are indicative of greater transmission of light, and less opacity. Opacity (O) was determined according to O=100-T.

Method for Frequency Analysis

A 4 mm×4 mm cross-sectional sample was prepared to inspect for the presence of layer-by-layer 3D printing artifacts, a transition line between layers, which is characteristic of the layer-by-layer printing process of the Comparative Examples. Examples of the continuous printing method of the present disclosure are expected to have an absence of such artifacts. Samples were placed on an Olympus MX61 optical microscope such that the field of view represented approximately 1 mm². Under transmissive microscopic imaging, the cross-section of the sample was analyzed for an oscillating pattern that correlates to the regular discontinuities in the bulk material. The pattern typically required a method of accentuating the weak oscillation captured by an image. Since the oscillation was regular, a frequency analysis of the image revealed a signal that could be amplified while simultaneously suppressing other features in the image that did not contribute to the oscillation. The frequency analysis was performed in MATLAB per the following steps:

(i) A fast Fourier transform was performed on the image
(ii) The 2-dimensional spatial power spectrum was found from the results of (i)
(iii) The peak signal was located in (ii)
(iv) An apodization filter centered on the signal peak was used to suppress the data in (i) not related to the original artifact
(v) An enhanced image was found by inverse fast Fourier transforming the filtered data in (iv)

The absence of an artifact was defined by the lack of any significant signal maxima that rose above the background (per part (ii)). If no characteristic frequency of the power spectrum was differentiated from the background, then there was no regular pattern that could be attributed to discretely layered 3D printed bulk material in the cross-sectional analysis, indicating a continuous printing method.

Examples 1-6

Ceramic test pieces were printed according to the Method for Continuous 3D Printing. The printed samples were dried according to the Method for Supercritical Fluid Extraction, and subsequently processed according to the Method for Burnout and Pre-sinter, the Method for Ion Exchange, and the Method for Sintering to form fully dense ceramic articles. The sintered samples were then analyzed according to the Method for Measuring Flexural Strength of Ceramic articles, the Method for Measuring Opacity of Ceramic Articles, the Method for Measuring Archimedes Density, and/or the Method for Frequency Analysis. The samples and flex strength, opacity, density, and frequency analysis results are summarized in Tables 5-8, respectively, below.

Comparative Examples 1-4

Ceramic test pieces were printed according to the Method for Layer-by-Layer 3D Printing. The printed samples were dried according to the Method for Supercritical Fluid Extraction, and subsequently processed according to the Method for Burnout and Pre-sinter, the Method for Ion Exchange, and the Method for Sintering to form fully dense ceramic articles. The sintered samples were then analyzed according to the Method for Measuring Flexural Strength of Ceramic articles, the Method for Measuring Opacity of Ceramic Articles, the Method for Measuring Archimedes Density, and/or the Method for Frequency Analysis. The samples and flex strength, opacity, density, and frequency analysis results are summarized in Tables 5-8, respectively, below.

TABLE 5

Flexural strength results

| Sample | Printing Sol | Printer | n, Sample Size | Median Flex Strength (MPa) | Standard Deviation |
|---|---|---|---|---|---|
| Comparative Example 1 | PS1 | ASIGA 405 nm | 10 | 1173.96 | 484.16 |
| Comparative Example 2 | PS1 | ASIGA 405 nm | 5 | 1610.99 | 392.28 |
| Example 1 | PS1 | Continuous | 16 | 846.69 | 306.01 |
| Example 2 | PS4 | Continuous | 11 | 932.85 | 266.41 |

TABLE 6

Opacity results

| Sample | Formulation | Printer | n, Sample Size | Median Opacity |
|---|---|---|---|---|
| Comparative Example 3 | PS1 | ASIGA 405 nm | 3 | 75.08 |
| Comparative Example 4 | PS2 | ASIGA 405 nm | 3 | 73.37 |
| Example 3 | PS1 | Continuous | 2 | 72.70 |
| Example 4 | PS2 | Continuous | 3 | 70.75 |
| Example 5 | PS5 | Continuous | 2 | 44.745 |

TABLE 7

Archimedes density results

| Sample | Formulation | Printer | n, sample size | Median Density (g/cm³) |
|---|---|---|---|---|
| Comparative Example 4 | PS2 | ASIGA 405 nm | 1 | 6.07 |
| Example 3 | PS1 | Continuous | 3 | 6.06 |

TABLE 8

Frequency analysis of layered and continuous samples

| Sample | Formulation | Printer | Peak Frequency (1/pixel) | Signal to Noise Ratio (dB) |
|---|---|---|---|---|
| Comparative Example 4 | PS2 | ASIGA 405 nm (layer-by-layer) | 0.87 | 9.29 |
| Example 6 | PS3 | Continuous | No artifact detected | 0.00 |

All of the patents and patent applications mentioned above are hereby expressly incorporated by reference. The embodiments described above are illustrative of the present invention and other constructions are also possible. Accordingly, the present invention should not be deemed limited to the embodiments described in detail above and shown in the accompanying drawings, but instead only by a fair scope of the claims that follow along with their equivalents.

The invention claimed is:

1. An additive manufacturing method of making a ceramic article, the method comprising:
   a) obtaining a photopolymerizable sol comprising a plurality of ceramic particles distributed in the photopolymerizable sol, wherein the ceramic particles have an average particle size diameter of 1 nanometer (nm) to 100 nm;
   b) selectively polymerizing the photopolymerizable sol using actinic radiation while moving a build substrate through the photopolymerizable sol in an uninterrupted motion during an entirety of the polymerization to form a gelled article;
   c) extracting solvent from the gelled article to form an aerogel article or a xerogel article;
   d) heat treating the aerogel article or the xerogel article to form a porous ceramic article; and
   e) sintering the porous ceramic article to form a sintered ceramic article;
   wherein the sintered ceramic article exhibits a density of 98% or greater with respect to a theoretical density of a ceramic material of the ceramic particles and exhibits an opacity of 80% or less.

2. The method of claim 1, wherein the actinic radiation is directed at the photopolymerizable sol from above the photopolymerizable sol.

3. The method of claim 1, wherein the photopolymerizable sol is provided in a container and the build substrate moves towards a floor of the container during the selective polymerization of the photopolymerizable sol.

4. The method of claim 1, wherein the actinic radiation is provided by a projector projecting a sequence of two-dimensional images.

5. The method of claim 1, wherein the extracting is performed using supercritical fluid.

6. The method of claim 1, wherein the sintered ceramic article exhibits a density of 99% or greater, with respect to a theoretical density of the ceramic material.

7. The method of claim 1, wherein all cross-sectional portions of an interior of the sintered ceramic article having a plane with dimensions of 0.5 millimeters (mm)×0.5 mm are free of any frequency analysis signal maxima larger than a background signal.

8. The method of claim 1, wherein the sintered ceramic article exhibits an opacity of 70% or less.

9. The method of claim 1, wherein the sintered ceramic article exhibits a flex strength of 100 megapascals (MPa) or greater.

10. The method of claim 1, wherein the photopolymerizable sol comprises 3 to 45 vol. % of ceramic particles, based at least in part on the total volume of the photopolymerizable sol.

11. The method of claim 1, wherein the ceramic particles comprise metal oxide ceramic particles, non-oxide ceramic particles, or combinations thereof.

12. The method of claim 1, wherein the ceramic particles are selected from the group consisting of zirconia, silica, alumina, yttria, ceria, magnesium-magnesia aluminate (MMA), magnesium oxide, hydroxyapatite, fluorapatite, chlorapatite, calcite, cordierite, silicon carbide, silicon nitride, boron carbide, titanium diboride, zirconium diboride, boron nitride, titanium carbide, zirconium carbide, aluminum nitride, calcium hexaboride, MAX phase, and combinations thereof.

13. The method of claim 1, further comprising, prior to step b), retrieving, from a non-transitory machine readable medium, data representing a 3D model of a gelled article; and executing, by one or more processors, a 3D printing application interfacing with a manufacturing device using the data to generate, by the manufacturing device, a physical object of the gelled article.

14. The method of claim 1, further comprising, prior to step b), receiving, by a manufacturing device having one or more processors, a digital object comprising data specifying a gelled article; and generating, with the manufacturing device by an additive manufacturing process, the gelled article based at least in part on the digital object.

15. The method of claim 1, wherein the actinic radiation is provided as a continuous sequence of projected images during the uninterrupted motion of the build substrate.

16. The method of claim 1, further comprising forming a coating layer on at least a portion of the gelled article prior to heat treating.

17. The method of claim 1, wherein the photopolymerizable sol comprises an absorption modifier in an amount of 0.01 to 1 weight percent based at least in part on a total weight of the photopolymerizable sol.

18. The method of claim 1, wherein the gelled article is formed at a substantially constant rate of 0.5 millimeters per minute or greater along a build axis.

19. A ceramic article made by the method of claim 1.

20. An additive manufactured ceramic article exhibiting a density of 98% or greater with respect to a theoretical density of a ceramic material and exhibiting an opacity of 80% or less, wherein all cross-sectional portions of an interior of the additive manufactured ceramic article having a plane with dimensions of 0.5 mm×0.5 mm are free of a frequency analysis signal maxima larger than a background signal, and wherein the additive manufactured ceramic article is formed by continuous additive manufacturing involving uninterrupted movement of a substrate during photopolymerization of a photopolymerizable sol.

* * * * *